US009854404B2

(12) United States Patent
Edge et al.

(10) Patent No.: US 9,854,404 B2
(45) Date of Patent: Dec. 26, 2017

(54) TECHNIQUES FOR GENERATING ENVIRONMENT AND REFERENCE DATA REPORTS FOR PARTICULAR ENVIRONMENTS ON BEHALF OF MOBILE DEVICES

(71) Applicant: QUALCOMM Incorporated, San Diego, CA (US)

(72) Inventors: Stephen William Edge, Escondido, CA (US); Andreas Klaus Wachter, Menlo Park, CA (US); Lionel Jacques Garin, Palo Alto, CA (US); Grant Alexander Marshall, Campbell, CA (US)

(73) Assignee: QUALCOMM Incorporated, San Diefo, CA (US)

( * ) Notice: Subject to any disclaimer, the term of this patent is extended or adjusted under 35 U.S.C. 154(b) by 0 days.

(21) Appl. No.: 14/746,804

(22) Filed: Jun. 22, 2015

(65) Prior Publication Data

US 2015/0319578 A1 Nov. 5, 2015

Related U.S. Application Data

(62) Division of application No. 13/797,837, filed on Mar. 12, 2013, now Pat. No. 9,078,102.

(Continued)

(51) Int. Cl.
*H04W 4/02* (2009.01)
*G01C 5/06* (2006.01)
*G01C 21/20* (2006.01)

(52) U.S. Cl.
CPC ............ *H04W 4/025* (2013.01); *G01C 5/06* (2013.01); *G01C 21/206* (2013.01); *H04W 4/028* (2013.01)

(58) Field of Classification Search
CPC ........ H04W 4/025; H04W 4/028; G01C 5/06; G01C 21/206
See application file for complete search history.

(56) References Cited

U.S. PATENT DOCUMENTS

| 6,735,542 B1 | 5/2004 | Burgett et al. |
| 7,424,825 B2 | 9/2008 | Saporito et al. |

(Continued)

FOREIGN PATENT DOCUMENTS

| CN | 101067552 A | 11/2007 |
| CN | 101135567 A | 3/2008 |

(Continued)

OTHER PUBLICATIONS

Gohring, N., "App Feeds Scientists Atmospheric Data from Thousands of Smartphones," Feb. 1, 2013, MIT Technology Review, Communications News, Retrieved from <http://www.technologyreview.com/news/510626/app-feeds-scientists-atmospheric-data-from-thousands-of-smartphones/>.

(Continued)

*Primary Examiner* — Marcos Torres
(74) *Attorney, Agent, or Firm* — Berkeley Law & Technology Group, LLP

(57) ABSTRACT

Various methods, apparatuses and/or articles of manufacture are provided which may be implemented using one or more fixed electronic devices to generate a reference data report corresponding to a particular environment. Various methods, apparatuses and/or articles of manufacture are provided which may be implemented using one or more mobile electronic devices to generate an environment report corresponding to a particular environment.

20 Claims, 9 Drawing Sheets

Related U.S. Application Data

(60) Provisional application No. 61/725,423, filed on Nov. 12, 2012.

(56) References Cited

U.S. PATENT DOCUMENTS

| | | | |
|---|---|---|---|
| 7,751,949 B2 * | 7/2010 | Alanen et al. | 701/4 |
| 8,306,676 B1 | 11/2012 | Ingvalson et al. | |
| 8,321,074 B1 | 11/2012 | Bell et al. | |
| 8,831,507 B2 | 9/2014 | Murray et al. | |
| 2005/0272447 A1 | 12/2005 | Eckel | |
| 2010/0062794 A1 * | 3/2010 | Han | 455/457 |
| 2010/0250134 A1 | 9/2010 | Bornstein et al. | |
| 2012/0182180 A1 | 7/2012 | Wolf et al. | |
| 2012/0324042 A1 | 12/2012 | Graham et al. | |
| 2013/0169484 A1 | 7/2013 | Raghupathy et al. | |
| 2014/0012529 A1 | 1/2014 | Lee et al. | |
| 2014/0135040 A1 | 5/2014 | Edge et al. | |

FOREIGN PATENT DOCUMENTS

| | | |
|---|---|---|
| CN | 101194142 A | 6/2008 |
| CN | 102095420 A | 6/2011 |
| EP | 1154231 A1 | 11/2001 |
| EP | 2511657 A1 | 10/2012 |
| JP | 2005337872 A | 12/2005 |
| WO | WO-2004003472 A1 | 1/2004 |
| WO | WO-2006134500 A2 | 12/2006 |
| WO | WO-2010111402 A1 | 9/2010 |

OTHER PUBLICATIONS

International Search Report and Written Opinion—PCT/US2013/065263—ISA/EPO—dated Apr. 23, 2015.
Partial International Search Report—PCT/US2013/065263—ISA/EPO—dated Feb. 5, 2015.

* cited by examiner

600 ⤵

```
┌─────────────────────────────────────────────────┐
│ Generate a reference data report indicative of a reference │
│ atmospheric pressure corresponding to a reference altitude of a │
│ particular environment, and at least one of pressure validity area │
│ corresponding to the reference atmospheric pressure, and/or a │
│ pressure validity period corresponding to the reference │
│ atmospheric pressure │
└─────────────────────────────────────────────────┘
                                              └─ 602
                       ↓
┌─────────────────────────────────────────────────┐
│ Transmit an invitation requesting an environment report to at least │
│ one mobile device, the invitation corresponding to a crowd- │
│ sourcing function that may be performed, at least in part, by the │
│ first device using a plurality of environment reports received from │
│ a plurality of devices and corresponding to the particular │
│ environment │
│  ┌ ─ ─ ─ ─ ─ ─ ─ ─ ─ ─ ─ ─ ─ ─ ─ ─ ─ ─ ─ ─ ─ ┐  │
│  │ Transmit the reference data report to at least one │  │
│  │ mobile device │  │
│  └ ─ ─ ─ ─ ─ ─ ─ ─ ─ ─ ─ ─ ─ ─ ─ ─ ─ ─ ─ ─ ─ ┘  │
│                                      └─ 606       │
└─────────────────────────────────────────────────┘
                                              └─ 604
                       ↓
┌ ─ ─ ─ ─ ─ ─ ─ ─ ─ ─ ─ ─ ─ ─ ─ ─ ─ ─ ─ ─ ─ ─ ─ ─ ┐
│ Receive an environment report from at least one mobile device, │
│ the environment report being based, at least in part, on a │
│ measurement obtained via the environmental sensor │
└ ─ ─ ─ ─ ─ ─ ─ ─ ─ ─ ─ ─ ─ ─ ─ ─ ─ ─ ─ ─ ─ ─ ─ ─ ┘
                                              └─ 608
                       ↓
┌ ─ ─ ─ ─ ─ ─ ─ ─ ─ ─ ─ ─ ─ ─ ─ ─ ─ ─ ─ ─ ─ ─ ─ ─ ┐
│ Affect a model corresponding to at least a portion of the particular │
│ environment based, at least in part, on at least a portion of at least │
│ one environment report obtained from at least one mobile device │
└ ─ ─ ─ ─ ─ ─ ─ ─ ─ ─ ─ ─ ─ ─ ─ ─ ─ ─ ─ ─ ─ ─ ─ ─ ┘
                                              └─ 610
```

```
Receive an environment report from a mobile device, the
environment report being indicative of a measurement obtained
via an environmental sensor provisioned with the mobile device,
and a location of the mobile device
```
⎿ 802

```
Generate a reference data report based, at least in part, on the
environment report, the reference data report being indicative of a
reference atmospheric pressure corresponding to a reference
altitude of a particular environment corresponding to the location
of the mobile device
```
⎿ 804

```
Transmit (or initiate transmission of) the reference data report to
the mobile device
```
⎿ 806

FIG. 8

TECHNIQUES FOR GENERATING ENVIRONMENT AND REFERENCE DATA REPORTS FOR PARTICULAR ENVIRONMENTS ON BEHALF OF MOBILE DEVICES

This application is a divisional application of U.S. patent application Ser. No. 13/797,837, filed Mar. 12, 2013, entitled, "TECHNIQUES FOR GENERATING ENVIRONMENT AND REFERENCE DATA REPORTS FOR PARTICULAR ENVIRONMENTS ON BEHALF OF MOBILE DEVICES", which claims the benefit of and priority to U.S. Provisional Patent Application 61/725,423, filed Nov. 12, 2012, entitled, "METHOD AND/OR SYSTEM FOR ASSISTED ALTITUDE DETERMINATION", and which is assigned to the assignee hereof and incorporated herein by reference.

BACKGROUND

1. Field

The subject matter disclosed herein relates to fixed and mobile electronic devices, and more particularly to methods, apparatuses and articles of manufacture for use by one or more fixed electronic devices to generate a reference data report and/or one or more mobile electronic devices to generate an environment report corresponding to a particular environment.

2. Information

Precise and reliable determination by a mobile device of its current altitude above sea level or above or below some other known reference (absolute altitude) may sometimes be useful or even necessary for certain services and applications. For example, the information may be used to determine which floor in a high budding a user who has just dialed an emergency call is on when the user either does not know the floor or is unable to convey this to an emergency services responder (e.g. due to language or speech difficulties or a poor call connection). Determination of precise absolute altitude for mobile wireless devices using existing standard positioning methods such as Assisted-Global Satellite Navigation System (A-GNSS), Observed Time Difference of Arrival (OTDOA), Advanced Forward Link Trilateration (AFLT), Enhanced Cell ID (E-CID), etc., to name just a few may not always be possible due to the inherent limitations of these positioning technologies and impediments to receiving and accurately measuring relevant radio signals. For example, depending on the position of the satellites in the sky and the amount of sky cover from nearby buildings, trees and hills etc., altitude resolution for Assisted-GNSS may only be possible within a few hundred feet in an outdoor environment and may not be possible at all inside a building. Other methods such as OTDOA, AFLT or E-CID combined with a terrain or contour map (which may provide a known ground level for any known horizontal location) may be unreliable due to unknown height inside a building.

Barometric pressure sensors in a mobile device can be used to overcome these shortcomings. Barometric pressure sensors in a mobile device measure the atmospheric pressure at the mobile device's location. These pressure measurements can then be used by the mobile device (either in combination with other positioning technologies such as Assisted-GNSS, etc. or on their own) to calculate either (i) the mobile device's absolute altitude given knowledge of the current atmospheric pressure at sea level (or some other well defined reference level) or (ii) the mobile device's relative altitude above (or depth below) local ground level. Other sensors in the mobile device such as a thermometer, light sensor or hygrometer may be used to obtain other data concerning the local environment and determine or help determine whether a mobile device is outside or indoors which may additionally assist computation of the mobile devices absolute or relative altitude.

SUMMARY

In accordance with certain aspects, a method for determining an altitude of a mobile device is provided, which may be implemented at a mobile device. The method may comprise: generating an environment report indicative of a first measurement obtained via an environmental sensor provisioned with the mobile device, and a location of the mobile device; transmitting the environment report to a remote device; receiving at a different time a reference data report from the remote device; obtaining a second measurement using the environmental sensor; and determining at least one of: an altitude for the mobile device, and/or a calibration parameter for the mobile device based, at least in part, on the reference data report and the second measurement.

In accordance with certain aspects, an apparatus for determining an altitude of a mobile device may comprise: means for generating an environment report indicative of a first measurement obtained via an environmental sensor provisioned with the mobile device, and a location of the mobile device; means for transmitting the environment report to a remote device; means for receiving at a different time a reference data report from the remote device; means for obtaining a second measurement using the environmental sensor; and means for determining at least one of: an altitude for the mobile device, and/or a calibration parameter for the mobile device based, at least in part, on the reference data report and the second measurement.

In accordance with certain aspects, a mobile device may comprise: an environmental sensor; a network interface unit; and a processing unit to: generate an environment report indicative of a first measurement obtained via the environmental sensor, and a location of the mobile device; initiate transmission of the environment report to a remote device via the network interface unit; receive at a different time a reference data report from the remote device via the network interface unit; obtain a second measurement via the environmental sensor; and determine at least one of: an altitude for the mobile device, and/or a calibration parameter for the mobile device based, at least in part, on the reference data report and the second measurement.

In accordance with certain aspects, an article of manufacture may be provided which comprises a non-transitory computer readable medium having computer implementable instructions stored therein that are executable by a processing unit of a mobile device to: generate an environment report indicative of a first measurement obtained via an environmental sensor provisioned with the mobile device, and a location of the mobile device; initiate transmission of the environment report to a remote device; receive at a different time a reference data report from the remote device; obtain a second measurement using the environmental sensor; and determine at least one of: an altitude for the mobile device, and/or a calibration parameter for the mobile device based, at least in part, on the reference data report and the second measurement.

In accordance with certain aspects, a method may be provided for implementation at an electronic device. The method may comprise: receiving an environment report from a mobile device, the environment report being indicative of a measurement obtained via an environmental sensor provisioned with the mobile device, and a location of the mobile device; generating a reference data report based, at least in part, on the environment report, the reference data report being indicative of a reference atmospheric pressure corresponding to a reference altitude of a particular environment corresponding to the location of the mobile device; and transmitting the reference data report to the mobile device.

In accordance with certain aspects, an apparatus may comprise: means for receiving an environment report from a mobile device, the environment report being indicative of a measurement obtained via an environmental sensor provisioned with the mobile device, and a location of the mobile device; means for generating a reference data report based, at least in part, on the environment report, the reference data report being indicative of a reference atmospheric pressure corresponding to a reference altitude of a particular environment corresponding to the location of the mobile device; and means for transmitting the reference data report to the mobile device.

In accordance with certain aspects, a device may comprise a network interface unit; and a processing unit to: receive an environment report from a mobile device via the network interface unit, the environment report being indicative of a measurement obtained via an environmental sensor provisioned with the mobile device, and a location of the mobile device; generate a reference data report based, at least in part, on the environment report, the reference data report being indicative of a reference atmospheric pressure corresponding to a reference altitude of a particular environment corresponding to the location of the mobile device; and initiate transmission of the reference data report to the mobile device via the network interface unit.

In accordance with certain aspects, an article of manufacture may comprise a non-transitory computer readable medium having computer implementable instructions stored therein that are executable by a processing unit of an electronic device to: receive an environment report from a mobile device, the environment report being indicative of a measurement obtained via an environmental sensor provisioned with the mobile device, and a location of the mobile device; generate a reference data report based, at least in part, on the environment report, the reference data report being indicative of a reference atmospheric pressure corresponding to a reference altitude of a particular environment corresponding to the location of the mobile device; and initiate transmission of the reference data report to the mobile device.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 5, FIG. 6 and FIG. 8 are flow diagrams illustrating certain example processes that may be implemented within an electronic device to generate a reference data report, and obtain an environment report corresponding to a particular environment from one or more mobile devices, in accordance with an example implementation.

DETAILED DESCRIPTION

Figure 1:
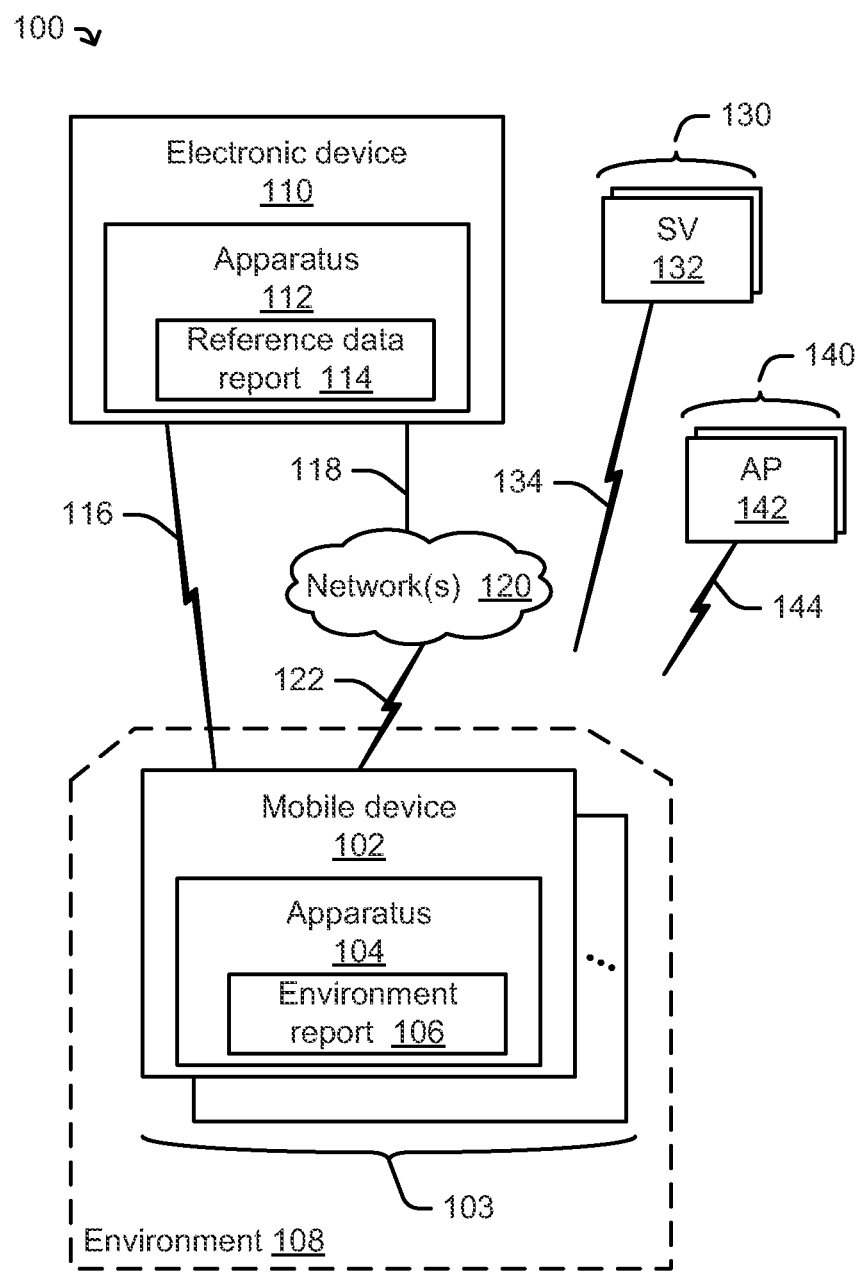
FIG. 1 is a schematic block diagram illustrating an arrangement of representative fixed and mobile electronic devices including an electronic device to generate a reference data report, and a mobile device to generate an environment report corresponding to a particular environment, in accordance with an example implementation.

While the following description refers to reception and use of reference data reports and generation of environment reports by a mobile device, it should be appreciated that fixed and nomadic electronic devices (e.g. a WiFi access point, base station, Personal Computer) may just as easily receive and generate these reports in a similar or the same manner as described herein for a mobile device.

The terms electronic device, remote electronic device, remote device and server and used interchangeably herein and typically refer to a fixed device or entity such as a computing and/or communications platform. The terms mobile device and mobile wireless device are used interchangeably herein and typically refer to a terminal or other device that can engage in wireless communications and can move between different locations. The terms location, location estimate, position and position estimate are used interchangeably herein and typically refer to a geographic location which may be either (i) a point on or above or below the surface of the Earth which may be represented by coordinates (e.g. latitude and longitude and possibly altitude) or by a civic description name (such as an address or a well known name) or (ii) a small area or volume on, above or below the surface of the Earth within which an entity of interest (e.g. a mobile device) is located with some known or assumed probability. The terms environment report and environmental report are used interchangeably herein.

Existing standard positioning methods for mobile wireless devices such as A-GNSS, OTDOA, AFLT and E-CID typically operate by coupling a location server to a mobile device whose location is needed. The location server may then provide assistance data to the mobile device to direct and enable the mobile device to make appropriate measurements of radio signals from sources such as GNSS satellites (e.g. satellites for the US Global Positioning System (GPS), European Galileo system or Russian GLONASS system) and/or network base stations and access points. The mobile device may subsequently return the measurements to the location server for computation of a location estimate or the mobile device may compute a location estimate itself with the help, in some cases, of more assistance data from the location server. The location server is typically part of or reachable from some serving wireless network or a home wireless network for the mobile device. One example of a location server is a Secure User Plane Location (SUPL) Location Platform (SLP) that has been defined for the SUPL location solution by the Open Mobile Alliance (OMA). Another example is an Enhanced Serving Mobile Location Center (E-SMLC) that has been defined by an organization known as the 3$^{rd}$ Generation Partnership Project (3GPP) for locating a mobile device that is accessing a network using the Long Term Evolution (LTE) radio technology. For these location servers and other servers, positioning of a mobile device may take place by first establishing a positioning session between the location server and mobile device and using a positioning protocol to convey assistance data from the location server to the mobile device and to convey measurements or a location estimate from the mobile device to the location server. An example of a positioning protocol applicable to LTE radio access is the LTE Positioning Protocol (LPP) defined in publicly available documents by 3GPP. An example of a positioning protocol applicable to both LTE and other radio technologies is the LPP Extensions (LPPe) protocol defined in publicly available documents from OMA. LPPe is defined to operate in conjunction with LPP such that an LPPe message is normally embedded within an LPP message with the combined message referred to as an LPP/LPPe message and the combined protocol referred to as LPP/LPPe.

To a limited degree, existing standard positioning protocols enable conveyance of atmospheric pressure assistance data from a location server to a mobile device that could be used to help assist determination of the altitude of the mobile device. Specifically, LPPe is able to provide atmospheric pressure data within assistance data transmitted to mobile devices as part of an A-GNSS process wherein A-GNSS is an intended position method for the mobile device. In the case of LPPe, such A-GNSS atmospheric pressure data is typically used as an input for atmospheric (e.g. tropospheric) delay models, e.g. to calculate a tropospheric delay encountered by GNSS satellite signals.

As is well known, certain atmospheric pressure data may also be useful for altitude determination, e.g., by comparing a reference atmospheric pressure corresponding to a reference altitude with a local atmospheric pressure obtained by a barometric sensor provisioned with the mobile device.

To obtain such A-GNSS atmospheric pressure data as described above, a mobile device may need to be participating in, or at least configured to participate in, an A-GNSS process. Unfortunately, some mobile devices may not be provisioned with any satellite positioning system (SPS) capabilities, and/or may not be capable of necessarily participating in such an A-GNSS process. For example, certain mobile devices may be configured to perform certain positioning functions, such as those defined for the OTDOA, AFLT and E-CID position methods, that are based on wireless signals obtained from terrestrial-based transmitting devices, e.g., such as dedicated position Beacon transmitting devices, cellular base stations, wireless network service access devices (e.g., WLAN access points, etc.), just to name a few examples. By way of another example, certain mobile devices may be configured to perform positioning functions based on SPS signals obtained from space vehicles (SVs) e.g., GPS satellite(s), Galileo satellite(s), Glonass satellite(s), etc., in a standalone mode without assistance from a location server. Consequently, some mobile devices may be unable to obtain such A-GNSS related atmospheric pressure data.

In certain instances, a mobile device which is able to participate in an A-GNSS process (e.g. using LPPe) and obtain such A-GNSS atmospheric pressure data may be able to use such A-GNSS atmospheric pressure data within a relatively short time to successfully determine its altitude, e.g., with reference to the reference altitude. Unfortunately, since the atmospheric pressure at most locations tends to change over time, there would likely be a limited window of time during which such obtained A-GNSS atmospheric pressure data may prove useful to a mobile device. Accordingly, a mobile device may need to obtain updated A-GNSS atmospheric pressure data from a location server (e.g. SLP or E-SMLC) from time to time, and/or possibly on a fairly regular basis. Unfortunately, such data downloading activities may impact on often limited processing, memory, communication, and/or available power resources.

In accordance with certain aspects of the present description, various techniques are provided which may be implemented in various methods, apparatuses, and/or articles of manufacture to allow a mobile device to obtain a reference data report corresponding to a particular environment from a (remote electronic device such as a location server. As described in greater detail herein, in certain instances such a reference data report may be provided to a mobile device by an electronic device (e.g. location server) in response to a request for such a reference data report. In certain instances, such a reference data report may be provided to one or more mobile devices by one or more electronic devices as a consequence of one or more crowd-sourcing functions. Accordingly, in certain example implementations, a reference data report may be provided to the mobile device regardless as to whether or not the mobile device is capable of participating in an A-GNSS process, or even capable of supporting an SPS positioning function.

Moreover, in certain example implementations, such a reference data report may comprise a reference atmospheric pressure corresponding to a particular environment (e.g., which may be an indoor environment or an outdoor environment), and possibly additional information which may be considered by a mobile device to better apply such a reference atmospheric pressure for that particular environment, and/or for an extended period of time, possibly even accounting for potential changes in the local atmospheric pressure. For example, as described in greater detail herein, in certain implementations a reference data report may be indicative of a pressure validity area (e.g., a bounded region of space, a particular indoor environment) a pressure validity period (e.g., period of time), a reference pressure rate (e.g., an expected rate of change over time), a directional pressure gradient (e.g., a northward gradient, an eastward gradient), and/or the like or some combination thereof corresponding to a reference atmospheric pressure for a reference altitude corresponding to a particular environment. In certain example implementations, one or more positioning protocols, e.g., as may have been previously used to support an A-GNSS process as previously mentioned, may be further adapted, at least in part, to accommodate and/or otherwise support such a reference data report as presented in many of the examples herein.

Further still, in accordance with yet other aspects of the present description, all or part of the information indicated by a reference data report may be based, at least in part, on one or more environment reports (corresponding to a particular environment or a particular set of environments) and/or weather related reports obtained from one or more mobile devices. In certain example implementations all or part of the information indicated by a reference data report may be obtained, at least in part, from one or more models corresponding to a particular environment. For example, in certain implementations, some information indicated by a reference data report may be obtained, at least in part, from one or more atmospheric models, e.g., outdoor environment related weather forecasting/reporting models (e.g., regarding barometric pressure, temperature, humidity, other weather phenomenon), and/or possibly other environmental phenomenon related models (e.g., regarding sunspot monitoring/predictions, magnetic field fluctuations). For example, in certain implementations, some information indicated by a reference data report may be obtained, at least in part, from one or more other types of models and/or the like which may correspond to one or more indoor environments, e.g., possibly corresponding to certain known or expected structures, objects and/or other like features which may, at times, affect one or more environmental phenomenon which may be detected and/or measured by environmental sensor available to a mobile device.

Furthermore, as illustrated in some examples herein, in certain instances information indicated by a reference data report may have been based, at least in part, on one or more environment or weather related reports corresponding to a particular environment, e.g., as generated by one or more mobile devices. As described in greater detail herein, in certain instances a plurality of environment reports may be solicited and/or otherwise obtained as part of a crowd-sourcing function, and one or more models which may be used, at least in part, to generate a reference data report may be affected based, at least in part, on information obtained or otherwise derived from one or more of the environment reports. Hence, in certain instances such environment reports introduce a potential for feedback regarding a particular environment as experienced by one or more mobile devices; and, such feedback may be considered when generating a subsequent reference data report. As such, in certain instances a reference atmospheric pressure and/or other like information indicated in a reference data report may be based, at least in part, on information obtained via one or more environment reports.

For example, a reference atmospheric pressure for a particular indoor region (e.g. a multistory building) may be determined, at least in part, based on one or more local atmospheric pressures and/or a local atmospheric pressure history as indicated via one or more environment reports received from one or more mobile devices. Indeed, in certain instances there may be a slight differential between an outdoor barometric pressure and an indoor barometric pressure, and as such it may be beneficial for a mobile device to obtain an appropriate reference atmospheric pressure for an indoor environment and/or otherwise be able to account for such differences, e.g., particularly when estimating its altitude and vertical position within a building. As such, in certain example implementations it may be possible for a reference data report to be provided to a mobile device (that may be entering and/or within such an indoor region), which may be indicative of a reference atmospheric pressure and reference altitude suitable for use within the indoor region (e.g., by a positioning function within the mobile device) to determine a current altitude of the mobile device and hence possibly to identify a particular floor of the multistory building in which the mobile device may be currently located.

Accordingly, in certain example implementations, an environment report from a mobile device may be indicative of a variety of different detectable, measurable, and/or otherwise possibly observable phenomenon within a particular environment. Indeed, as described in greater detail herein, in addition to environmental sensor-based measurements, etc., in certain example implementations an environment report from a mobile device may be further and/or alternatively indicative of information based, at least in part, on one or more user-supplied observations. For example, in certain instances (possibly as part of a crowd-sourcing function) one or more users may be prompted to indicate whether their particular environment is an indoor environment or an outdoor environment, which floor/level they may be currently located on, whether or not roadways appear to be icy or dry, to estimate how much snow has fallen or the size of hail being experienced, or possibly whether there are any tornadoes or funnel clouds visible, just to name a few examples.

Accordingly, in certain implementations a crowd-sourcing function and/or the like may assist in refining information in a reference data report and/or otherwise affecting one or more models relating thereto corresponding to a particular environment. Likewise, in certain implementations, a crowd-sourcing function and/or the like may assist in gathering various forms of information via mobile devices corresponding to a particular environment. In certain example implementations, a crowd-sourcing function and/or the like may allow for a plurality of mobile devices to serve, at least in part, as a distributed/selectable set of weather reporting stations, and/or the like reporting on certain phenomenon within a particular environment.

With this introduction in mind, attention is now drawn to FIG. 1, which is a schematic block diagram illustrating an example arrangement 100 comprising at least one mobile device 102 having an apparatus 104 capable of generating an environment report 106 corresponding to at least a portion of a particular environment 108. As described in greater detail herein, arrangement 100 may comprise a plurality of mobile devices 103, each of which may have a capability to generate an environment report corresponding to at least a portion of particular environment 108. In some implementations, some of mobile devices 103 may be present at other environments (e.g. may be present at locations other than the location of mobile device 102) at the same time as mobile device 102 is present in environment 108. In some implementations, mobile device 102 may be present at environment 108 for a temporary time period (e.g. a few seconds, a few minutes or a few hours) and may move to other environments (e.g. may move to other locations) at other times. In some implementations, mobile device 102 may be present at environment 108 periodically or intermittently (e.g. if mobile device 102 returns to a particular location periodically or intermittently).

As presented herein, particular environment 108 may, for example, be representative of at least a portion of an indoor environment, and/or at least a portion of an outdoor environment. As used herein, an indoor environment may comprise a limited region of space which is essentially bounded, at least in part, by one or more man-made structures and/or naturally occurring objects that may, at times, impede line-of-sight reception and/or transmission of certain wireless signals particularly in comparison to an outdoor environment. In some instances, for example, all or part of an indoor environment may comprise a fixed arrangement of one or more man-made structures and/or naturally occurring objects forming a region of space that may, at times, shelter, at least in part, one or more people from naturally occurring weather phenomena, e.g., wind, rain, snow, sunshine, etc. Hence, in certain instances an indoor environment may comprise all or part of one or more structures, such as, e.g., one or more buildings, a fully of partially covered parking garage, a fully or partially covered stadium, a fully of partially covered walkway, an arboretum, a greenhouse, a tunnel, a cave, certain naturally occurring canyons or man-made "urban canyons", and/or the like or some combination thereof just to name a few examples. In some implementations, environment 108 may be limited to a region of space throughout which conditions (e.g. temperature, lighting, humidity, barometric pressure) are constant or almost constant. Examples of such environments include a room in a building, a floor of a building, a portion of a stairwell in a building, a corridor or a portion of a corridor in a building, an enclosed amphitheater or a portion of an enclosed amphitheater, a gate area or portion of an airport terminal, the platform of a train subsystem, etc.

Conversely, as used herein, an outdoor environment may comprise any region of space that may not be considered an indoor environment. Consequently, an outdoor environment may or may not have few if any nearby man-made structures and/or naturally occurring objects which might significantly impede line-of-sight reception and/or transmission of certain wireless signals. Hence, in certain instances, an outdoor environment may comprise all or part of a region of space adjacent to one or more buildings, a parking lot, an outdoor park or field, certain streets or motorways, and/or the like or some combination thereof just to name a few examples.

Regardless as to whether particular environment 108 comprises an indoor environment and/or an outdoor environment, mobile device 102 is intended to represent any electronic device that may be carried by a person (and/or a machine and/or attached to some object) capable of moving and/or navigating and/or being moved within at least a portion of particular environment 108. Thus, by way of example, mobile device 102 may represent a portable communication and/or computing device, such as, e.g., a cellular telephone, a smart phone, a tablet computer, a laptop computer, a navigation and/or tracking device, a wearable computer, an attached tracking device and/or the like or some combination thereof.

As described in greater detail herein, apparatus 104 may generate an environment report 106 based, at least in part, on one or more measurements from one or more environmental sensors (not shown) provisioned with mobile device 102. For example, in certain instances, environment report 106 may be based, at least in part, on current and/or stored historical measurements corresponding to a particular environment 108 obtained via a barometer, a thermometer, a hygrometer, a magnetometer, radiometer, a particle detector, a light detector, etc. In certain instances, an environment report 106 may be based, at least in part, on one or more user-supplied observations corresponding to a particular environment 108. Indeed, in certain instances, an environment report may be based, at least in part, on one or more reference phenomenon values (e.g., other than an example reference atmospheric pressure) that may be indicated in certain reference data reports.

In certain example implementations, an environment report 106 may be indicative of a local atmospheric pressure and/or an atmospheric pressure history (e.g., barometric pressure(s) measured in hectoPascal (hPa), etc.), a local atmospheric temperature and/or atmospheric temperature history (e.g., ambient temperature measured in centigrade, etc.), a local atmospheric humidity and/or humidity history.

In certain example implementations, an environment report 106 may be indicative of a current horizontal position and/or horizontal position history (e.g., latitude and longitude coordinates, etc.) of mobile device 102, a movement and/or a movement history (e.g., relative change(s) in horizontal position, speed(s), velocity(s), trajectory(s), heading(s), etc., corresponding to a positioning function and/or other like capability) of mobile device 102, and/or an altitude and/or altitude history (e.g., a vertical distance from a reference point such as sea level, etc.) of mobile device 102.

In certain example implementations, environment report 106 may be indicative of one or more calibration parameters that may have been applied to or may be applicable to one or more sensor-based measurements used to generate environment report 106. Here, one or more of such calibration parameters may be determined based, at least in part, on information in a reference data report 114 obtained from an electronic device 110.

In certain example implementations, environment report 106 may be indicative of whether mobile device 102 is or was more likely located within an indoor environment or an outdoor environment wherein certain sensor-based measurements and/or indoor user-supplied observations were obtained. For example, if mobile device 102 is moving (intermittently or continuously) and stores a history of sensor measurements made at different times and for different locations in environment report 106, movement from an outdoor to an indoor environment may be inferred from one or more of: (i) a sudden change in pressure (e.g. an increase of pressure when entering a building due to use of an air conditioning or heating system based on forced air inside the building); (ii) a sudden change in temperature (e.g. an increase in temperature when moving from a cold outdoor environment to a warm indoor environment or a decrease in temperature when moving from a hot outdoor environment to a temperate indoor environment); and/or (iii) a sudden change in lighting (e.g. a decrease in lighting when moving from a sunlit outdoor environment to an artificially lit indoor environment or an increase in lighting when moving from a nighttime outdoor environment to a lit indoor environment). The inverse of the changes exemplified in (i), (ii) and (iii) may be used to infer a movement from an indoor to an outdoor environment, Other types of sensor measurements and sensor measurer ent changes may also be used to infer location in an indoor versus outdoor environment or movement from one such environment into another—e.g. sounds (voices, traffic, echoes), ultra violet radiation, vibration (e.g. from a vehicle)—and may be used to further discriminate between different types of indoor environment (such as being inside a budding or subway system or underground parking lot or inside a vehicle) and different types of outdoor environment (such as an open field, a street, a forest, a mountain).

Knowledge of whether mobile device 102 is indoors or outdoors may be used in some implementations to infer an altitude for mobile device 102 based on a terrain or contour map that provides the ground level altitude at any location. Such a terrain or contour map may be available to mobile device 102 if provisioned in mobile device 102 by some server (e.g. electronic device 110) or at manufacture. In this case, mobile device 102 may determine its altitude when mobile device can infer that is either outdoors or on the ground floor inside building and is able to determine its horizontal location (e.g. using A-GNSS, OTDOA, AFLT or E-CID). Alternatively, such a terrain or contour map may be available to electronic device 110, in which case electronic device 110 may use the environment report 106 provided by mobile device 102 to determine the altitude of mobile device 102 for horizontal locations provided by mobile device 102 whose associated sensor measurements indicate that mobile device 102 is either outdoors or on the ground floor of a building. Determination that mobile device 102 is inside a building but on the ground floor may be possible by first inferring that mobile device 102 has moved from an outdoor to an indoor environment and then inferring (e.g. via use of inertial sensors such as accelerometers) that mobile device 102 has not yet moved up or down inside a building. Such a terrain or contour map may be further used to determine the altitude of mobile device 102 (by either mobile device 102 or electronic device 110) if barometric pressure measurements from mobile device 102 or other sensor measurements (e.g. from accelerometer(s), gyroscope(s), magnetometer(s) etc.) provide a relative altitude for mobile device 102 above or below ground level. In this case, a terrain or contour map may be usable to determine altitude of mobile device 102 inside a building even when mobile device is not at ground level.

In certain implementations, apparatus 104 may generate an environment report 106 based, at least in part, on information in and/or derived from a reference data report 114 which may be generated, at least in part, by an apparatus 112 provisioned in at least one (remote) electronic device 110. By way of example, electronic device 110 may represent one or more computing platforms provisioned as part of one or more servers (e.g. a location server such as a SUPL SLP), and/or other like electronic devices.

As described in greater detail herein, in certain instances apparatus 112 may generate a reference data report 114 based, at least in part, on information from one or more environment reports 106 obtained from one or more mobile devices. For example, in certain instances apparatus 112 may perform and/or otherwise support one or more crowd-sourcing functions which gather current and/or historical information via environment reports from a plurality of mobile devices 103. In certain instances, a crowd-sourcing function may allow for a model (e.g., an environmental model) corresponding to a particular environment to be affected in some manner based, at least in part, on information obtained in and/or derived from one or more environment reports from mobile devices that may be currently located within (or may have been previously located within) the particular environment. In certain instances, reference data report may be based, at least in part, on data obtained from sources other than mobile devices such as a national or local weather service or weather bureau, environmental sensors attached to network base stations and access points, wireless environmental sensors attached to vehicles, trains, ships and airplanes etc.

Accordingly, in certain example implementations, arrangement 100 may provide for a monitoring capability in which a plurality of mobile devices may be invited, e.g. as part of a crowd-sourcing function, to gather certain data regarding phenomena within a particular environment 108. By way of example, arrangement 100 may provide for a weather monitoring capability wherein a plurality of mobile devices 103 may gather sensor measurements, etc., and/or user-supplied inputs regarding particular environment 108, generate corresponding environment reports, and transmit such environment reports to electronic device 110. In another example, arrangement 100 may provide for a radiation monitoring capability wherein a plurality of mobile devices 103 may gather sensor measurements, etc., and/or user-supplied inputs regarding applicable phenomena in particular environment 108, generate corresponding environment reports, and transmit such environment reports to electronic device 110.

Those skilled in the art will recognize that a variety of different capabilities for monitoring, forecasting, modeling, testing, etc., such measurable and/or observable phenomena may be supported, at least in part, by the example techniques provided herein. Accordingly, unless otherwise expressly stated, claimed subject matter is not intended to necessarily be limited by any of the examples described herein.

As illustrated in FIG. 1, mobile device 102 and electronic device 110 may communicate directly or indirectly via one or more wired and/or wireless communication links, as illustrated here, respectively, by example direct communication link 116, and via a combination of communication link 118, network(s) 120, and communication link 122. Network(s) 120 is intended to represent all or part of one or more other electronic devices and/or communication facilities/resources capable of supporting wired and/or wireless electronic communication. Thus for example, network(s) 120 may comprise all or part of a telephone network, a cellular telephone network, a wireless communication network, an intranet, the Internet, and/or the like or some combination thereof.

Although communication link 118 is illustrated here as representing a "wired" communication link it should be understood that in certain instances communication link 118 may represent one or more wired and/or wireless communication links. Furthermore, it should be understood that a "wired" communication link may comprise electrically conductive wires, cables, etc., and/or similar light or other wavelength conductive members, e.g., fiber-optic cables, waveguides, etc.

As further illustrated, in certain implementations, arrangement 100 may comprise one or more space positioning systems (SPS) 130 and/or terrestrial positioning systems 140, which may transmit applicable wireless signals that may, at times, be acquired by mobile device 102 and used, at least in part, to support a positioning function. Here, for example, SPS 130 may comprise a plurality of space vehicles (SVs) 132, each of which may transmit one or more SPS signals 134. Further, for example, a terrestrial positioning system 140 may comprise a plurality of base stations and access points (APs) 142 and/or the like, which may transmit one or more positioning signals 144 or other signals 144 that may be used for positioning.

While mobile device 102 is located within an outdoor environment, it may be possible for mobile device 102 to acquire certain SPS signals 134, which may then be used, at least in part, to assist in determining all or part of at least a horizontal position of mobile device 102, and/or other position/movement parameters. Indeed, in certain instances, mobile device 102 may acquire sufficient SPS signals 134 to determine its altitude.

Unfortunately, as alluded to, while mobile device 102 is located within certain indoor environments or portions thereof, mobile device 102 may be unable to acquire a sufficient number of (or even one) SPS signals 134. Nonetheless, in some instances, while located within certain indoor environments, mobile device 102 may acquire one or more positioning signals 144 from one or more APs 142, which may be used, at least in part, to determine all or part of at least a horizontal position of mobile device 102, and/or other position/movement parameters.

Unfortunately, in certain instances, regardless as to whether the mobile device is within an indoor or an outdoor environment, a mobile device 102 may simply not acquire a sufficient number of SPS signals 134 and/or positioning signals 144 to allow a positioning function to determine an altitude (or accurate altitude) of mobile device 102. Likewise, in some instances, certain positioning signals 144 may not necessarily be useful in determining an altitude (or accurate altitude) of mobile device 102. For example, a positioning signal 144 acquired from an AP 142 may only be useful in determining a horizontal position if only a horizontal position of the AP is known or determinable.

As alluded to earlier herein, it may be possible to determine an altitude for mobile device 102 when a horizontal position for mobile device 102 can be obtained (e.g. from SPS signals 134 and/or positioning signals 144) if a terrain or contour map is available to mobile device 102 or to some server (e.g. electronic device 110) in communication with mobile device 102. But in some instances, it may not be possible to obtain an accurate or reliable horizontal position for mobile device or a terrain or contour map for the location of mobile device 102 may not be available or mobile device 102 may infer that it may be inside a building at an unknown height above or depth below ground level. In these circumstances, it may not be possible to obtain an altitude for mobile device 102 using the aforementioned means.

In accordance with certain example implementations provided herein, a mobile device 102 may be able to determine its altitude based, at least in part, on reference data report 114 and sensor measurements that may or may not be gathered for generating environment report 106. By way of example, reference data report 114 may be indicative of at least a reference atmospheric pressure (corresponding to a reference altitude such as sea level or some known height above sea level or some known height above or depth below a reference ellipsoid or other reference shape accurately representative of the surface of the Earth) with regard to particular environment 108. Mobile device 102 may then determine a local atmospheric pressure, e.g., using an onboard barometer, and determine an altitude of mobile device 102 based on the reference atmospheric pressure, e.g., using known altimetry techniques. In some implementations, reference data report 114 may include a defined validity area and/or validity time period, enabling mobile device 102 to determine whether the reference atmospheric pressure is valid or not for the current horizontal location of mobile device 102 and the current time. In some implementations, reference data report 114 may provide a spatial and/or temporal gradient for a reference atmospheric pressure, or other information, enabling mobile device 102 to determine a reference atmospheric pressure within and/or outside of any given validity area or validity time period.

Figure 2:
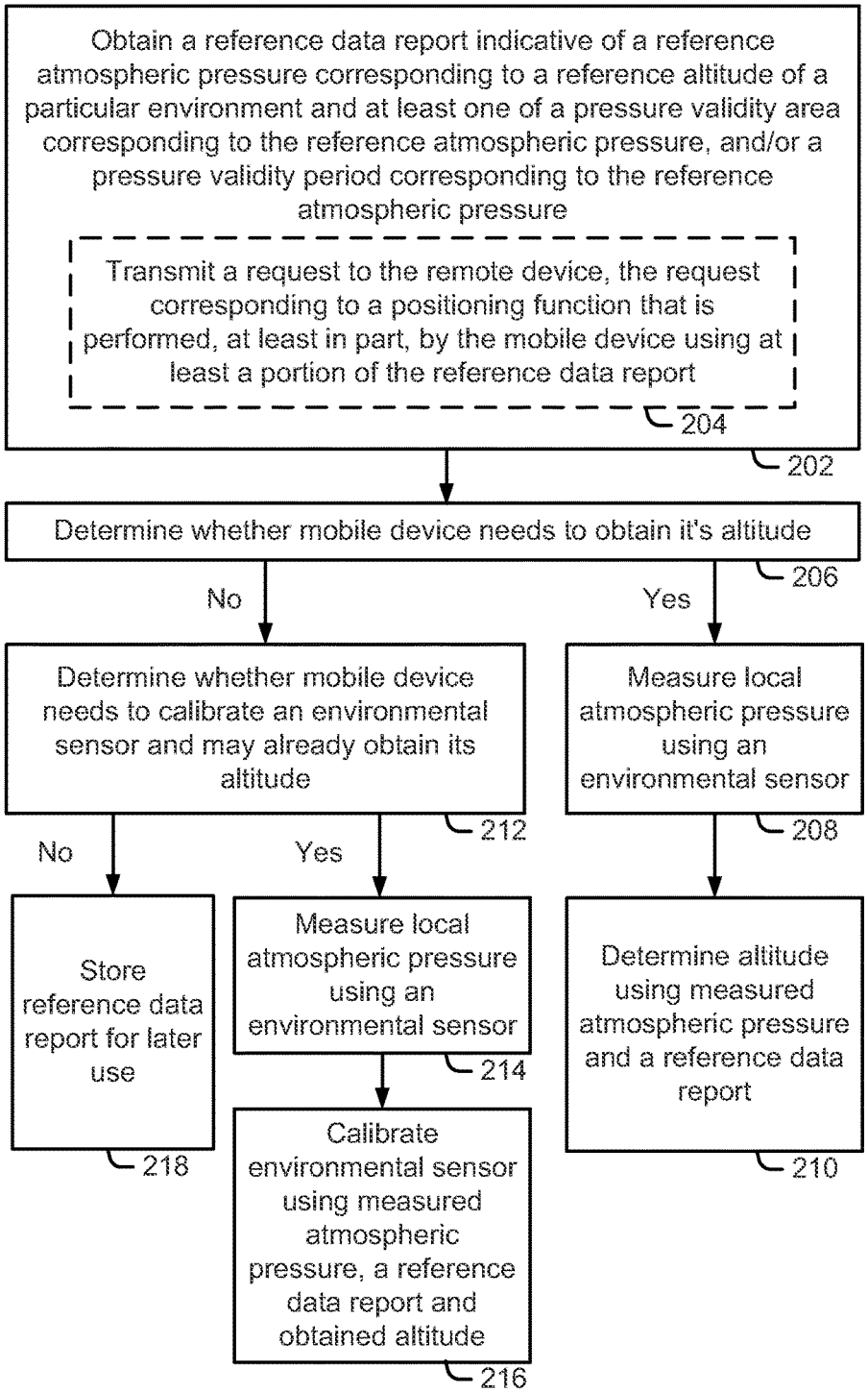
FIG. 2, FIG. 3, FIG. 4, and FIG. 7 are flow diagrams illustrating certain example processes that may be implemented within a mobile device to obtain a reference data report generated by an electronic device, and generate an environment report corresponding to a particular environment, in accordance with an example implementation.

Attention is drawn next to FIG. 2, which is a flow diagram illustrating an example process 200 that may be implemented, at least in part, in a mobile device 102 to receive and process a reference data report 114.

At example block 202, mobile device 102 may obtain a reference data report 114 indicative of at least a reference atmospheric pressure corresponding to a reference altitude of a particular environment 108, and optionally at least one of: a pressure validity area corresponding to the reference atmospheric pressure, and/or a pressure validity period corresponding to the reference atmospheric pressure. By way of example block 204, in certain instances, mobile device 102 may transmit a request (e.g., in the form of one or more messages such as one or more SUPL messages and/or one or more LPP/LPPe positioning protocol messages) for a reference data report 114 to remote device 110. Here, for example, such a request may correspond to a positioning function that is performed (e.g., currently being performed or expected to be performed), at least in part, by mobile device 102 using at least a portion of reference data report 114. In certain other instances, reference data report 114 may be provided to mobile device 102 (e.g. by remote device 110) in the absence of any request from mobile device 102—e.g. through some prior arrangement or if remote device 110 knows the capabilities of mobile device 102 to make use of reference data report 114. Reference data report 114 may be provided to mobile device 102 (e.g. by remote device 110) in the form of one or more messages such as one or more SUPL messages and/or one or more LPP/LPPe positioning protocol messages. In some implementations, remote device 110 may determine a reference data report 114 at least in part using environmental reports 106 received from mobile device 102 at a previous time or at previous times and/or from other mobile devices 103 at a previous time or times according to process 300 in FIG. 3 and/or process 400 in FIG. 4. Remote device 110 may then send the determined reference data report 114 to mobile device 102 at block 202.

At example block 206, mobile device 102 may determine whether it needs to determine its altitude but is unable to do so without making use of reference data report 114. If the output of this determination is yes, then at block 208, mobile device 102 may obtain a measurement of local atmospheric pressure using an environmental sensor (or more than one environmental sensor) provisioned with mobile device 102. As previously mentioned, by way of example, in certain instances an environmental sensor may comprise a barometer, a thermometer, a hygrometer, etc. Mobile device 102 may then also determine its horizontal location either accurately or approximately (e.g. based on a location for its serving cell in the case of an approximate location) and determine whether this location is within any pressure validity area for the reference data report 114. Mobile device may further determine whether the current time (e.g. known to mobile device 102 or obtained from a serving network or SPS signals) is within any pressure validity period for reference data report 114. If these conditions are fulfilled or if reference data report 114 is otherwise considered by mobile device 102 to be unconditionally reliable (e.g. because remote device 110 took into account the location of mobile device 102 and the current time when assembling reference data report 114), then at example block 210, mobile device 102 may use reference data report 114 to determine its altitude based, at least in part, on the measured local atmospheric pressure and a reference atmospheric pressure obtained via reference data report 114. Mobile device 102 may also store the reference data report 114 for later use—e.g. to determine its altitude at some later time.

If the output of the determination at block 206 is "No", then at example block 212, mobile device 102 may determine whether it needs to calibrate or recalibrate an environmental sensor (or more than one environmental sensor) associated with measuring or using local atmospheric pressure and is able to determine its altitude using a means other than measuring local atmospheric pressure (e.g. using SPS signals 134 and/or positioning signals 144 and/or a terrain or contour map). If the output of the determination at example block 212 is "yes", then at example block 214, mobile device 102 may measure local atmospheric pressure using an environmental sensor (or more than one environmental sensor) and proceed to example block 216. At block 216, mobile device 102 may calibrate the environmental sensor (or more than one environmental sensor) used to measure local atmospheric pressure at block 214 using the measured atmospheric pressure, reference data report 114 and an altitude for mobile device 102 obtained by means other than measuring local atmospheric pressure. By way of example for block 216, mobile device 102 may determine a calibration parameter determined, at least in part, on reference data report 114 and the local atmospheric pressure measurement. For example, in certain instances a barometer and/or supported altimeter capability (and/or corresponding measurements) may be adjusted or otherwise affected in some manner based on the calibration parameter. The calibration parameter may be the calculated atmospheric pressure at the determined horizontal location and attitude of mobile device 102 and at the current time based on the reference atmospheric pressure and any spatial or temporal pressure gradient information in reference data report 114. Mobile device 102 may then calculate an adjustment to one or more of its sensors (e.g. barometric sensor, hygrometer, thermometer) that are needed to align an internal determination of atmospheric pressure by mobile device 102 with the calculated atmospheric pressure. In some implementations (e.g. when more than one environmental sensor needs to be calibrated), mobile device 102 may repeat block 216 several times at different locations and times (and possibly using different reference data reports 114 for each repetition of block 216) in order to obtain sufficient calibration parameters to accurately adjust the environmental sensor or sensors. Mobile device 102 may also store the reference data report 114 and/or repeat the calibration process at example block 216 at other times and locations (e.g. through further repetitions of process 200 or further repetitions of just blocks 214 and 216) to achieve higher calibration accuracy and reliability and to achieve recalibration when sensor changes in mobile device 102 render some previous calibration no longer accurate or reliable.

If the output of the determination at block 212 is "no", then at block 218, mobile device 102 may store the reference data report 114 obtained at block 202 for later use. For example, mobile device 102 may perform block 206 and/or block 212 plus blocks subsequent to each of these at a later time using stored reference data report 114 if mobile device 102 needs to obtain its altitude or needs to calibrate an environmental sensor at a later time and/or at a different location that are still within any validity period and/or validity area, respectively, provided for stored reference data report 114.

Figure 3:
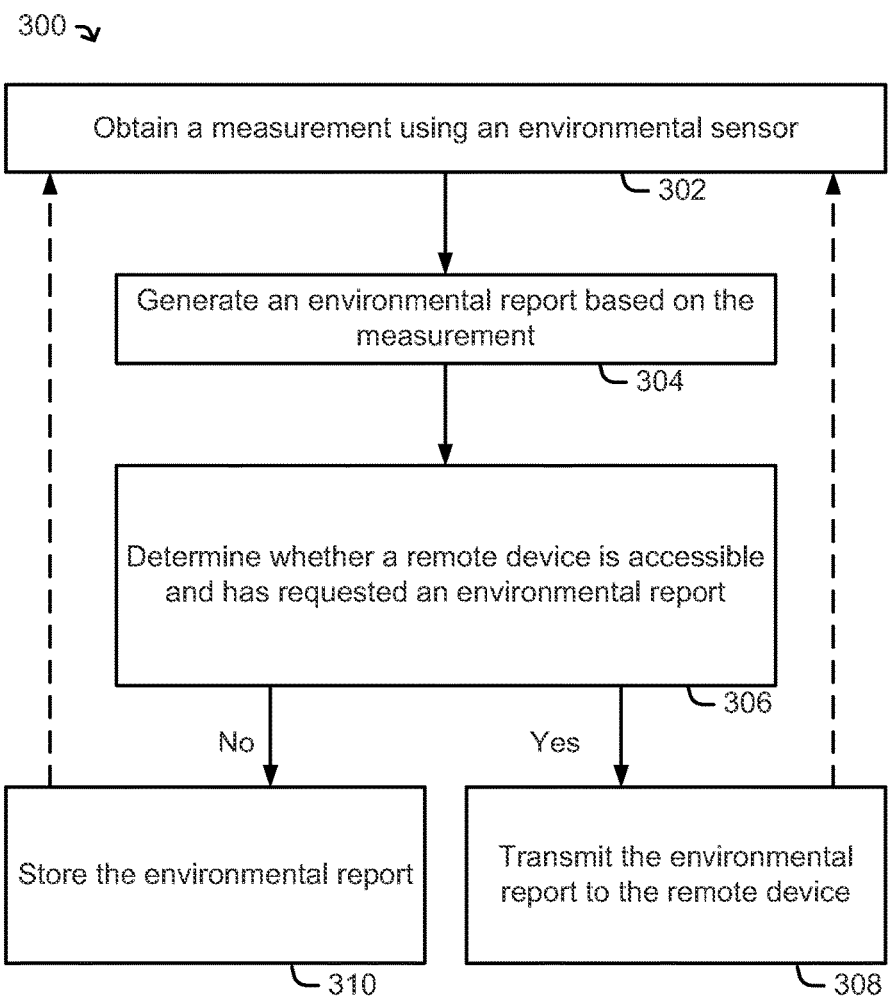

Attention is drawn next to FIG. 3, which is a flow diagram illustrating an example process 300 that may be implemented, at least in part, in a mobile device 102 to generate an environment report 106. At example block 302, mobile device 102 may obtain a measurement using an environmental sensor. Examples of measurements for different environmental sensors include: a local atmospheric pressure for a barometer; a temperature for a thermometer; a humidity for a hygrometer; a light or UV level for a light or UV sensor; an audio level or audio frequency for an audio sensor: a direction for a magnetometer or gyroscope. In some implementations, mobile device 102 may obtain additional measurements at block 302 using other environmental sensors and may obtain location related measurements (e.g. from measurements of SPS signals 134 and/or positioning signals 144) from which a horizontal location and in some cases an altitude for mobile device 102 may be obtained. At example block 304, mobile device 102 may generate an environment report 106 based, at least in part, on the one or measurements obtained via at least one environmental sensor at block 302. For example, in certain instances, an environment report 106 may include a current horizontal location and/or a current altitude of mobile device 102 which may be determined, at least in part, based on measurements of a number of SPS signals 134 and/or positioning signals 144 made at block 302. Such measurements may be included in or in association with environment report 106, in which case a remote device (e.g. remote device 110) may compute the horizontal location and altitude of mobile device 102, or may be used by mobile device 102 to compute its horizontal location and altitude which may then be included in or in association with environmental report 106. In some implementations, the measurement of SPS signals 134 and/or positioning signals 144 and/or the computation of horizontal location and altitude may be assisted by a remote device (e.g. remote device 110) through the provision of assistance data to mobile device 102 (e.g. provided using SUPL and/or LPP/LPPe messages). In some implementations, mobile device 102 or a remote device (e.g. remote device 110) may use a terrain or contour map to determine or help determine the altitude of mobile device 102 as described earlier herein. Environment report 106 may further comprise a measured local atmospheric pressure obtained via an onboard barometer of mobile device 102 and measurements of other environmental conditions such as humidity, temperature, lighting, sound level, type of sounds etc. Similarly, in certain instances, an environment report 106 may be indicative of a history of location and environmental measurements made by mobile device 102 at different locations and/or at different times in the past in which the location and environmental measurements made at a particular location and time comprise one or more of (i) a horizontal location and/or altitude, (ii) measurements of SPS signals 134 and/or positioning signals 144 and (iii) one or more sensor measurements such as barometric pressure, humidity and temperature. In certain example implementations, an environment report 106 may be indicative of a current local atmospheric pressure, a local atmospheric pressure history, a current horizontal position, a horizontal position history, a current movement, a movement history, a current atmospheric temperature, an atmospheric temperature history, a current atmospheric humidity, an atmospheric humidity history, a calibration parameter, and/or the like or some combination thereof. In certain example implementations, an environment report 106 may be indicative of whether mobile device 102 may be more likely within an indoor environment or an outdoor environment, e.g., as possibly determined by a positioning function, one or more acquired signals (e.g., SPS signals 134, positioning signals 144) and/or lack thereof, etc. Environment report 106 may further include the date and time (e.g. in the form of a time stamp) at which any particular set of environmental measurements and any associated horizontal location and altitude (or location measurements) were obtained by mobile device 102.

In some implementations, environment report 106 may comprise a horizontal location of mobile device 102 (e.g. latitude and longitude coordinates) but not an altitude. Horizontal location may be determined using such methods as A-GNSS, OTDOA, AFLT and E-CID. In some implementations, environment report 106 may comprise a relative altitude of mobile device 102 (e.g. relative altitude above or below ground level) and may be obtained by mobile device 102 using inertial sensors (e.g. accelerometers, gyroscopes, magnetomers, a barometer, and/or a compass). In some implementations, environment report 106 may comprise measurements that indicate or help indicate whether mobile device is in a certain environment (e.g. is indoors or outdoors). In some implementations if mobile device 102 is indoors, environment report 106 may include an air pressure difference and/or temperature difference between an indoor environment and an outdoor environment.

In certain example implementations, at example block 304, mobile device 102 may generate an environment report 106 based further, at least in part, on a user-supplied observation corresponding to the particular environment. Here, for example, apparatus 104 and/or a positioning function and/or the like of mobile device 102 may initiate a process by which a user (e.g. human) may be prompted via one or more output units (e.g., a display device, a speaker, etc.) to input information regarding particular environment 108 via one or more input units (e.g., a touch screen device, a keyboard, a microphone, etc.). Thus, for example, in certain instances a user may be prompted to identify particular environment 108 as being an indoor environment or an outdoor environment. In another example, in certain instances a user may be prompted to identify whether or not certain weather-related (and/or other) phenomena may be observed as occurring or as having recently occurred at or nearby their current location within a particular environment 108. Here for example, a user may be prompted to identify the presence or absence of certain observable conditions, such as, e.g., a clear sky, an overcast sky, a thunderstorm, a tornado, rain, hail, snow, road conditions, flooding, lightning strikes, etc.

Following compilation of the environmental report 106 at block 304, mobile device 102 may determine at example block 306 whether a remote device 110 is accessible for communication (e.g. directly or via network(s) 120) and has requested or otherwise needs to receive an environmental report at the current time. The request for an environmental report may have been received by mobile device 102 from remote device 110 at some previous time or at the current time and may have specified the time or times when mobile device 102 should transmit an environmental report 106 to remote device 110 or other conditions when mobile device 102 should transmit an environmental report 106 to remote device 110. Conditions for transmitting an environmental report 106 may include (i) the occurrence or persistence of a particular environmental condition or set of conditions (e.g. a certain range of temperature or atmospheric pressure), (ii) a certain change to environmental conditions (e.g. a certain increase or decrease in temperature or atmospheric pressure), (iii) a change in the type of environment (e.g. movement of the mobile device 102 from an outdoor to an indoor environment or the reverse), (iv) the occurrence or persistence of a particular location for mobile device 102, (v) a certain change in the location or mobile device 102 (e.g. movement by mobile device of a certain distance from the location at which a previous environmental report 106 was transmitted by mobile device 102 to remote device 110), (vi) the occurrence of a certain time period following the time at which a previous environmental report 106 was transmitted by mobile device 102 to remote device 110, or (vii) other conditions. In some other implementations, mobile device 102 may not have received a request from remote device 110 to transmit environmental report 106 but may have been provisioned by other means (e.g. at manufacture or by some device other than remote device 110) to transmit an environmental report 106 to remote device 110 at certain times or under certain conditions.

If the output of the determination at block 306 is "yes", then, at example block 308, mobile device 102 may transmit an environment report 106 directly or indirectly to electronic device 110 (e.g., a remote device). The transmission may include sending one more messages comprising environmental report 106 from mobile device 102 to remote device 110 such as one or more SUPL messages and/or one or more LPP/LPPe positioning messages. Following block 308, mobile device 102 may repeat block 302 at some later time if remote device 110 may need further environmental reports 106 from mobile device 102.

If the output of the determination at block 306 is "no", then at example block 310, mobile device 102 may store the environmental report 106 together with the current date and time for later transmission to remote device 110 and may return to block 302 at some later time if remote device 110 may need further environmental reports 106 from mobile device 102. In some implementations (not shown in process 300), mobile device 102 may proceed from block 310 to block 306 at some later time if further environmental reports 106 may not be needed by remote device 110 but mobile device 102 may need to transmit the stored environmental report(s) to remote device 110 at a later time—e.g. when remote device 110 that was not initially accessible become accessible for communication at a later time.

Figure 4:
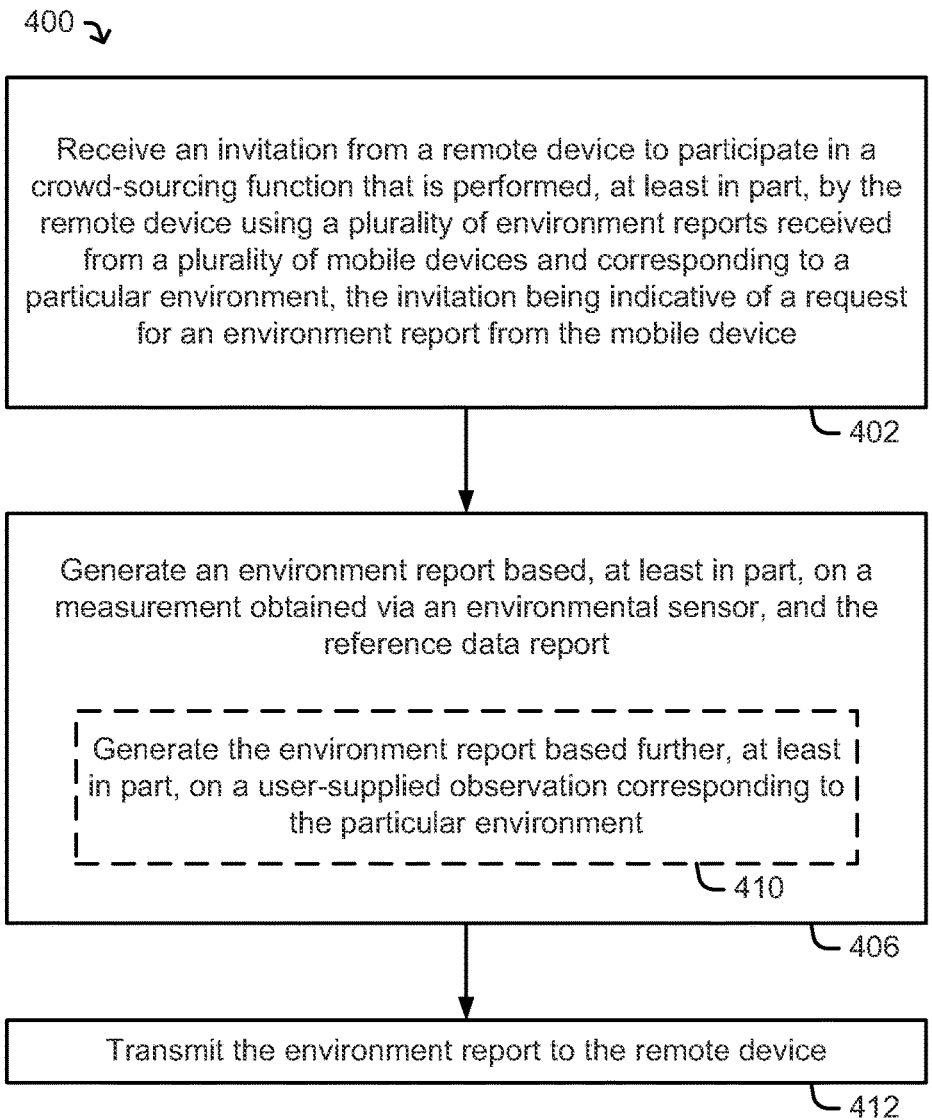

Attention is drawn next to FIG. 4, which is a flow diagram illustrating an example process 400 that may be implemented, at least in part, in a mobile device 102 to generate an environment report 106, which in this example may be for consideration by one or more crowd-sourcing functions, e.g., performed at least in part by a electronic device 110 (e.g., a remote device).

At example block 402, mobile device 102 may receive an invitation (e.g., via one or more messages such as one or more SUPL messages and/or one or more LPP/LPPe messages) from electronic device 110 to participate in a crowd-sourcing function that may be performed, at least in part, by electronic device 110 using a plurality of environment reports received from a plurality of mobile devices 103 and corresponding to a particular environment 108 or corresponding to multiple environments of which environment 108 is one example. Here, for example, such an invitation may be indicative of a request for an environment report 106 from mobile device 102.

At example block 406, mobile device 102 may generate an environment report 106 based, at least in part, on a measurement obtained via an environmental sensor. By way of example, in certain instances example block 406 may be the same as or similar to example blocks 302, 304, 306 and/or 310 of FIG. 3.

At example block 410, in certain instances, mobile device 102 may generate an environment report 106 based further, at least in part, on a user-supplied observation corresponding to particular environment 108. At example block 412, mobile device 102 may transmit an environment report 106 to electronic device 110. By way of example, in certain instances example block 412 may be the same as or similar to example block 308 in FIG. 3.

Figure 5:
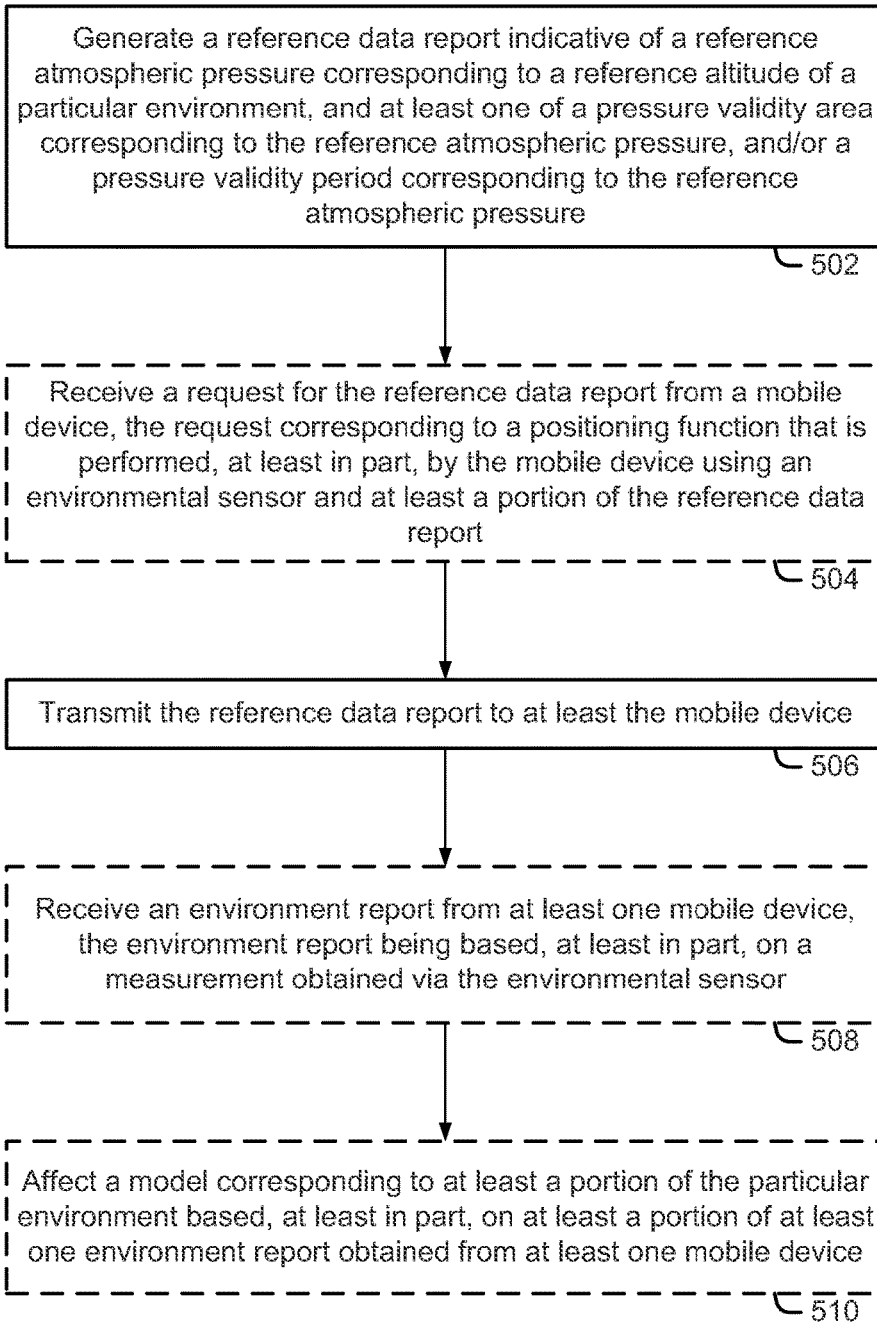

Reference is made next to FIG. 5, which is a flow diagram illustrating an example process 500 that may be implemented, at least in part, in an electronic device 110 to provide a reference data report 114 to a mobile device 102.

At example block 502, electronic device 110 may generate a reference data report 114 indicative of at least a reference atmospheric pressure corresponding to a reference altitude of a particular environment 108. As previously mentioned, in certain instances, a reference data report 114 may be further indicative of certain conditional aspects regarding such a reference atmospheric pressure, such as, e.g., a pressure validity area corresponding to the reference atmospheric pressure, a pressure validity period corresponding to the reference atmospheric pressure, etc. By way of example, in certain implementations, electronic device 110 may determine a reference atmospheric pressure based, at least in part, on one or more computer-based models (e.g., atmospheric models, weather prediction/forecasting models, etc.) corresponding to, and/or adapted for use with respect to, a particular environment 108 or a particular set of environments 108. Hence, in certain example implementations, electronic device 110 may determine a reference atmospheric pressure based, at least in part, on one or more expected/predicted barometric pressure estimates, and/or possibly one or more recent and/or current barometric pressure measurements, e.g., possibly obtained via one or more dedicated devices/sensors, one or more other electronic devices, one or more mobile stations, one or more environment reports, a national or local weather service or weather bureau etc. In certain instances a reference atmospheric pressure may be measured in a particular unit (e.g., hPa) and correspond to a reference altitude, such as, e.g., a zero level in a World Geodetic System 1984 (WGS84) reference or other like geoid.

At example block 504, in certain instances electronic device 110 may receive a request for reference data report 114 from a mobile device 102. Here, for example, such a request may correspond to a positioning function that is performed, at least in part, by the mobile device using an environmental sensor and at least a portion of the reference data report 114. In certain other implementations, electronic device 110 may receive some other indication (e.g. a set of positioning capabilities) from mobile device 102 indicating an ability to make use of reference data report 114 (e.g. via possession of an environmental sensor associated with reference data report 114). In some implementations, the request for reference data report 114 or indication that reference data report 114 can be used may be received by electronic device 110 in a SUPL message and/or in an LPP/LPPe positioning message.

It should be kept in mind that claimed subject matter is not necessarily intended to be limited by any particular temporal or other like ordering or structure has may be illustrated in the example flow diagrams presented herein. Indeed, a variety of different process flows may be implemented, wherein a different ordering occurs, wherein certain actions may occur concurrently, wherein certain actions may be skipped, wherein certain actions may iteratively performed, etc. Thus, by way of example, in process 500, in certain instances example block 504 (which by way of its dashed lines indicates it may be optional even in this example) may occur prior to example block 502. Likewise, in certain instances, example blocks 508 and/or 510 may be implemented in some manner to possibly affect current or later action as per the example block 502. Here, for example, in generating a reference data report at example block 502, an electronic device 110 may make use of available environment reports received from one or more mobile devices similar to example block 508, and/or a model affected by an available environment report similar to example block 510.

At example block 506, electronic device 110 may directly and/or indirectly transmit all or part of a reference data report 114 (e.g., via one or more messages such as one more SUPL messages and/or one or more LPP/LPPe positioning protocol messages) to one or more mobile devices. In certain example implementations, all or part of a reference data report 114 may be provided as part of an invitation to participate in a crowd-sourcing function, in response to a specific request for the reference data report 114 from a mobile device (e.g., as in example block 504), and/or possibly independent of or in conjunction with other forms of assistance data which may be of use, at least in part, to a positioning function and/or the like within a mobile device, just to name a few examples.

At example block 508, electronic device 110 may receive an environment report 106 from at least one mobile device 102. Here, for example, such an environment report 106 may be based, at least in part, on a measurement obtained via an environmental sensor provisioned with the mobile device (e.g. the environmental sensor referred to in block 504 or some other environmental sensor). Such an environmental report may correspond to an environmental report transmitted by mobile device 102 to remote device 110 in block 308 of process 300 or in block 412 of process 400 e.g. may comprise multiple current environmental measurements, multiple historic environmental measurements and associated time stamps, horizontal locations and altitudes for mobile device 102 and/or location measurements from which such horizontal locations and altitudes may be derived.

At example block 510, electronic device 110 may affect a model corresponding to at least a portion of a particular environment 108 or a particular set of environments 108, e.g., based, at least in part, on at least a portion of: at least one environment report 106 obtained from at least one mobile device 102. Electronic device 110 may perform one or more of the following operations at example block 510 with reference to an environmental report 106 received from a mobile device 102 when environmental report 106 includes at least a current local atmospheric pressure measurement from mobile device 102.

A. If environmental report 106 does not indicate that mobile device 102 is indoors and a horizontal location and altitude for mobile device 102 are included, use the included pressure measurement as the current local atmospheric pressure at the location and altitude of mobile device 102 and combine this with other such information (e.g. received from other mobile devices) for locations at or nearby to mobile device 102.

B. If environmental report 106 does not indicate that mobile device 102 is indoors and a horizontal location but not an altitude for mobile device 102 is included, determine the altitude of mobile device using the horizontal location and a terrain map or contour map. Then use the included pressure measurement as the current local atmospheric pressure at the location and altitude of mobile device 102 and combine this with other such information (e.g. received from other mobile devices) for locations at or nearby to mobile device 102.

C. If environmental report 106 indicates that mobile device 102 may be indoors and a horizontal location and relative altitude relative to ground level for mobile device 102 are included (where the relative altitude may be zero if mobile device 102 is at ground level), determine the altitude of mobile device using the horizontal location, a terrain map or contour map and the relative altitude. Then use the included pressure measurement as the current local atmospheric pressure at the location and altitude of mobile device 102 and combine this with other such information (e.g. received from other mobile devices) for locations at or nearby to mobile device 102. If the environmental report 106 further includes a pressure difference between the mobile device 102's indoor environment and an outdoor environment, further use the pressure difference to adjust the local atmospheric pressure in environmental report 106 to an atmospheric pressure valid in an outdoor environment (for the same location) before combining this with other information, D. If environmental report 106 indicates that mobile device 102 may be indoors and a horizontal location and altitude for mobile device 102 are included, use the included pressure measurement as the current local atmospheric pressure at the location and altitude of mobile device 102 and combine this with other such information (e.g. received from other mobile devices) for locations at or nearby to mobile device 102. If the environmental report 106 further includes a pressure difference between the mobile device 102's indoor environment and an outdoor environment, further use the pressure difference to adjust the local atmospheric pressure in environment report 106 to an atmospheric pressure valid in an outdoor environment (for the same location) before combining this with other information.

Operations A, B, C and/or D may be employed by electronic device 110 to create a portion of a reference data report 114 (e.g. a portion corresponding to a location at or nearby to a location of a mobile device 102 referenced in environmental report 106) or to adjust (e.g. improve the accuracy and validity of) a portion of an existing reference data report 114. The created or updated reference data report 114 may be further updated according to further received environmental reports 106 by further repetitions of blocks 508 and 510 and may also be transmitted to further mobile devices by further repetitions of block 506.

Attention is drawn next to FIG. 6, which is a flow diagram illustrating an example process 600 that may be implemented, at least in part, in an electronic device 110. Here, for example, electronic device 110 may be configured to perform, or to otherwise support, at least a part of one or more crowd-sourcing functions that may gather environment reports from mobile devices At example block 602, electronic device 110 may generate a reference data report 114, e.g., as previously described as being indicative of a reference atmospheric pressure corresponding to a reference altitude of a particular environment 108. In certain example implementations, such a reference data report 114 may be further indicative of a pressure validity area corresponding to the reference atmospheric pressure, a pressure validity period corresponding to the reference atmospheric pressure, a spatial pressure gradient inside of and/or outside of the pressure validity area, a temporal gradient inside of and/or outside of the pressure validity period, etc.

At example block 604, electronic device 110 may directly and/or indirectly transmit one or more invitations to one or more mobile devices 102. Such an invitation may, for example, request one or more applicable environment report(s) 106 corresponding to the crowd-sourcing function. By way of example, in certain instances, an invitation may indicate that an environment report 106 is to include current information and/or historical information gathered by mobile device. In certain instances, at example block 606, independent to and/or in conjunction with an invitation, electronic device 110 may transmit a reference data report 114 to at least one mobile device 102.

At example block 608, electronic device 110 may receive an environment report 106 from at least one mobile device 102. Example block 608 may, for example, be the same as or similar to example block 508 in FIG. 5. At example block 610, electronic device 110 may affect a model corresponding to at least a portion of particular environment 108 or a particular set of environments 108, e.g., based, at least in part, on at least a portion of at least one environment report obtained from at least one mobile device. Example block 610 may, for example, be the same or similar to example block 510 in FIG. 5.

The example processes illustrated in FIG. 2-8 may enable accurate and reliable determination of the altitude (either relative or absolute) by or on behalf of mobile devices such as mobile device 102 and mobile devices 103 in FIG. 1. Process 200 in FIG. 2 may enable a mobile device 102 to determine its altitude based at least in part on reception of a reference data report 114 from a remote device 110. Alternatively, as shown in process 200, if mobile device 102 is able to determine its altitude by other means (e.g. A-GNSS, use of a terrain or contour map), mobile device 102 may use a reference data report 114 to calibrate or recalibrate an environmental sensor that may then be used subsequently to obtain more accurate and reliable measurements for use in future altitude determination and/or in future generation of environment reports 106. Process 300 in FIG. 3 and process 400 in FIG. 4 may enable a mobile device 102 to generate and send an environment report 106 to a remote device 114 comprising one or more sensor measurements related to a local environment 108. Process 500 in FIG. 5 and process 600 in FIG. 6 may enable a remote device 110 to generate a reference data report 114 which may be based at least in part on data received by the remote device 110 in an environment report 106 received earlier from mobile device 102 and/or from mobile devices 103. Reference data report 114 may then be used by mobile device 102 to determine its altitude or calibrate a sensor. It may be appreciated that the combination of the processes 200, 300, 400, 500, 600, 700, and 800 may provide a means for obtaining the altitude of a mobile device when other existing methods are not usable or fail. The combination of the processes 200, 300, 400, 500, 600, 700, and 800 may also be sustainable with little or no dependence on other sources of environment data such as a national or local weather service or bureau. Indeed a mobile wireless operator may use some or all of these exemplary processes to enhance location services for its subscribers and possibly for subscribers to other networks without the need to subscribe to external sources of environment data such as that provided by national and local weather service bureaus.

Figure 7:
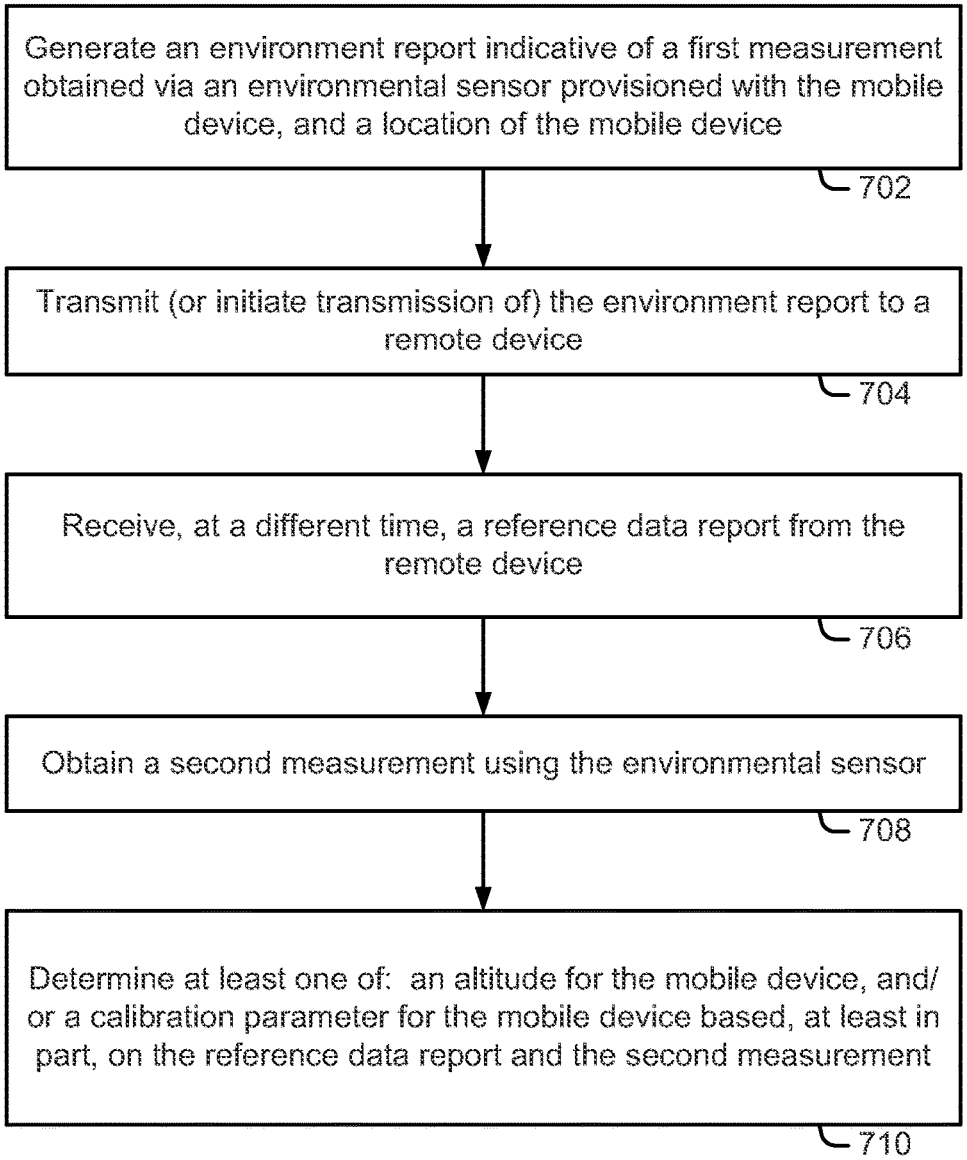

Attention is drawn next to FIG. 7, which is a flow diagram illustrating an example process 700 that may be implemented, at least in part, in a mobile device 102. In certain example implementations, process 700 may be implemented to determine an altitude of a mobile device.

An example block 702, an environment report may be generated which may be indicative of a first measurement obtained via an environmental sensor provisioned with the mobile device, and a location of the mobile device. By way of example, in certain instances the environmental sensor may comprise a barometer. Thus, for example, in certain instances the first measurement may be based, at least in part, on a local atmospheric pressure.

In certain example implementations, a location for the mobile device may be determined at least in part using at least one of: Assisted Global Navigation Satellite System (A-GNSS), Observed Time Difference of Arrival (OTDOA), Advanced Forward Link Trilateration (AFLT), Enhanced Cell ID (E-CID), inertial sensor(s) and/or the like or some combination thereof. In certain example implementations, a location of a mobile device may comprise an altitude component, a relative altitude component, and/or the like or some combination thereof. In certain example implementations, an altitude component may be determined, at least in part, using Assisted Global Navigation Satellite (A-GNSS), Observed Time Difference of Arrival (OTDOA), Advanced Forward Link Trilateration (AFLT), Enhanced Cell ID (E-CID), inertial sensor(s), a terrain or contour map, etc.

At example block 704, the environment report may be transmitted to a remote device, e.g., electronic device 110, by way of example, In certain implementations, an environment report may be indicative of a horizontal position of the mobile device, a horizontal position history for the mobile device, a movement of the mobile device, a movement history for the mobile device, an altitude of the mobile device, an altitude history for the mobile device, a relative altitude of the mobile device, a relative altitude history for the mobile device, a local atmospheric pressure, an atmospheric pressure history, a local atmospheric temperature, an atmospheric temperature history, a local atmospheric humidity, an atmospheric humidity history, and/or the like or some combination thereof. In certain implementations, an environment report may comprise an indication of an indoor environment, an indication of an outdoor environment, an atmospheric pressure difference between an indoor and an outdoor environment, and/or the like or some combination thereof At example block 706, at a different time, (e.g. subsequently), a reference data report may be received from the remote device. In certain instances, a reference data report may be based, at least in part, on the environment report, e.g. transmitted at block 704.

At example block 708, a second measurement may be obtained using the environmental sensor, and at example block 710 at least one of: an altitude for the mobile device, and/or a calibration parameter for the mobile device may be determined based, at least in part, on the reference data report and the second measurement.

Attention is drawn next to FIG. 8, which is a flow diagram stating an example process 800 that may be implemented, at least in part, in an electronic device 110, and which may correspond to process 700 which may be implemented in mobile device 102.

At example block 802 an environment report may be received from a mobile device 102. Here, for example, the environment report may be indicative of a measurement obtained via an environmental sensor provisioned with the mobile device, and a location of the mobile device. At example block 804, a reference data report may be generated based, at least in part, on the environment report. Here, for example, the reference data report may be indicative of a reference atmospheric pressure corresponding to a reference altitude of a particular environment corresponding to the location of the mobile device. At example block 806, the reference data report may be transmitted to the mobile device.

Figure 9:
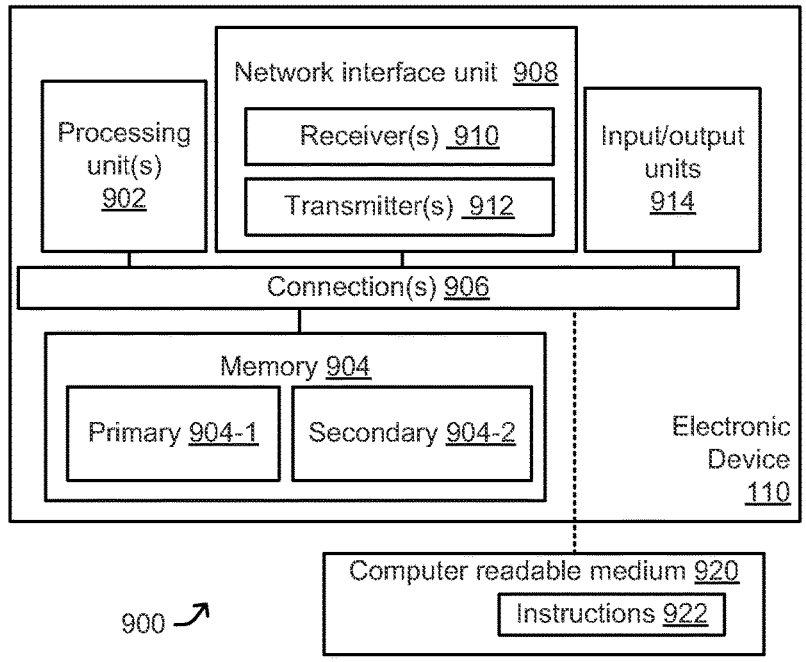
FIG. 9 is a schematic diagram illustrating certain features of an example electronic device to generate a reference data report, and obtain an environment report corresponding to a particular environment from one or more mobile devices, in accordance with an example implementation.

Attention is now drawn to FIG. 9, which is a schematic block diagram illustrating certain features of an example special computing platform 900 which may be provided as part of electronic device 110, and/or apparatus 112 provisioned therein.

As illustrated special computing platform 900 may comprise one or more processing units 902 (e.g., to perform data processing in accordance with the techniques provided herein, apparatus 112) coupled to memory 904 via one or more connections 906 (e.g., one or more electrical conductors, one or more electrically conductive paths, one of more buses, one or more fiber-optic paths, one or more circuits, one of more buffers, one or more transmitters, one or more receivers, etc.). Processing unit(s) 902 may, for example, be implemented in hardware or a combination of hardware and software. Processing unit(s) 902 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 904 may be representative of any data storage mechanism. Memory 904 may include, for example, a primary memory 904-1 and/or a secondary memory 904-2. Primary memory 904-1 may comprise, for example, a random access memory, read only memory, etc. While illustrated in this example as being separate from the processing units, it should be understood that all or part of a primary memory may be provided within or otherwise co-located/coupled with processing unit(s) 902, or other like circuitry within electronic device 110. Secondary memory 904-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-blended computer readable medium 920. Memory 904 and/or non-blended computer readable medium 920 may comprise instructions 922 for use in performing data processing, e.g., in accordance with the applicable techniques as provided herein.

Special computing platform 900 may, for example, further comprise one or more network interface unit(s) 908. Network interface unit(s) 908 may, for example, comprise one or more wired and/or wireless communication interfaces, represented here by one or more receivers 910 and one or more transmitters 912. It should be understood that in certain implementations, communication interface 908 may comprise one or more transceivers, and/or the like. Further, it should be understood that although not shown, communication interface 908 may comprise one or more antennas and/or other circuitry as may be applicable given the communication interface function/capability.

In accordance with certain example implementations, network interface unit(s) 908 may, for example, be enabled for use with various wired communication networks, e.g., such as telephone system, a local area network, a wide area network, a personal area network, an intranet, the Internet, etc.

Accordance with certain example implementations network interface unit(s) 908 and/or 908 (see FIG. 9) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFOMA) network, a Single-Carrier Frequency Division Multiple Access (SC-FDMA) network, and so on. A COMA network may implement one or more radio access technologies (RATs) such as cdma2000, Wideband COMA (WCDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), LTE Advanced, WiMAX, Ultra Mobile Broadband (UMB), and/or the like. Additionally, communication interface(s) 908 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Electronic device 110 may, for example, further comprise one or more input/output units 914. Input/output units 914 may represent one or more devices or other like mechanisms that may be used to obtain inputs from and/or provide outputs to one or more other devices and/or a user. Thus, for example, input/output units 914 may comprise various buttons, switches, a touch pad, a trackball, a joystick, a touch screen, a keyboard, and/or the like, which may be used to receive one or more user inputs. In certain instances, input/output units 914 may comprise various devices that may be used in producing a visual output, an audible output, and/or a tactile output for a user. For example, input/output units 914 may be used to present a video display, graphical user interface, etc., on a display mechanism.

Figure 10:
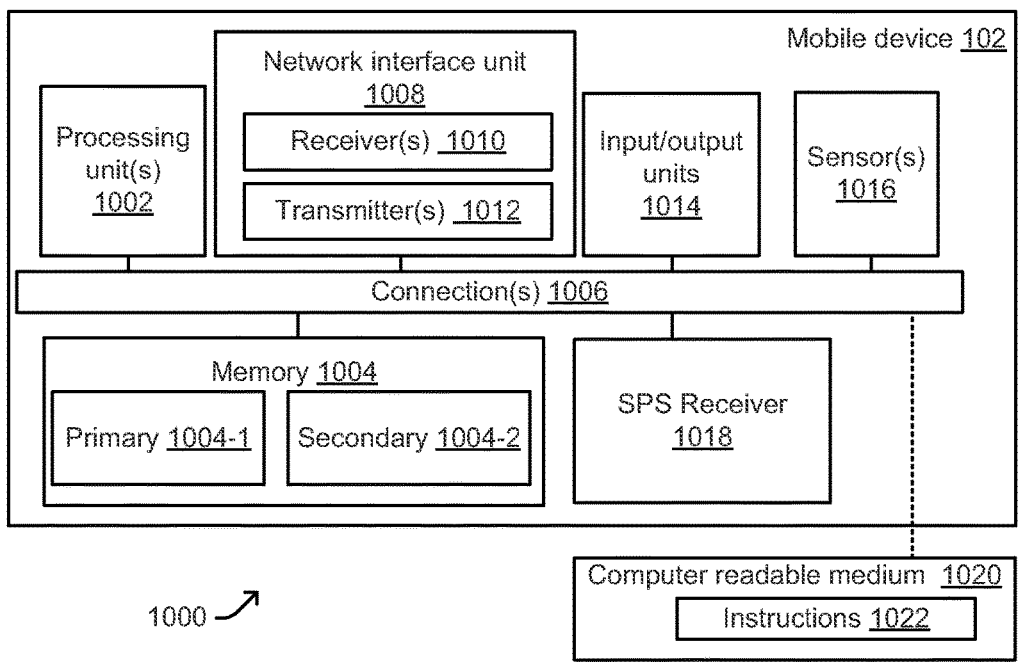
FIG. 10 is a schematic diagram illustrating certain features of an example mobile device to obtain a reference data report generated by an electronic device, and generate an environment report corresponding to a particular environment, in accordance with an example implementation.

Attention is now drawn to FIG. 10, which is a schematic block diagram illustrating certain features of an example special computing platform 1000 which may be provided as part of mobile device 102 and/or of some or all of mobile devices 103, and/or apparatus 104 provisioned therein.

As illustrated special computing platform 1000 may comprise one or more processing units 1002 (e.g., to perform data processing in accordance with the techniques provided herein, apparatus 104) coupled to memory 1004 via one or more connections 1006 (e.g., one or more electrical conductors, one or more electrically conductive paths, one or more buses, one or more fiber-optic paths, one or more circuits, one or more buffers, one or more transmitters, one or more receivers, etc.). Processing unit(s) 1002 may, for example, be implemented in hardware or a combination of hardware and software. Processing unit(s) 1002 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 1004 may be representative of any data storage mechanism. Memory 1004 may include, for example, a primary memory 1004-1 and/or a secondary memory 1004-2. Primary memory 1004-1 may comprise, for example, a random access memory, read only memory, etc. While illustrated in this example as being separate from the processing units, it should be understood that all or part of a primary memory may be provided within or otherwise co-located/coupled with processing unit(s) 1002, or other like circuitry within mobile device 102. Secondary memory 1004-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-blended computer readable medium 1020. Memory 1004 and/or non-blended computer readable medium 1020 may comprise instructions 1022 for use in performing data processing, e.g., in accordance with the applicable techniques as provided herein.

Special computing platform 1000 may, for example, further comprise one or more network interface units 1008. Network interface unit 1008 may, for example, comprise one or more wired and/or wireless communication interfaces, represented here by one or more receivers 1010 and one or more transmitters 1012. It should be understood that in certain implementations, network interface unit 1008 may comprise one or more transceivers, and/or the like. Further, it should be understood that although not shown, network interface unit 1008 may comprise one or more antennas and/or other circuitry as may be applicable given the communication interface function/capability.

In accordance with certain example implementations, network interface unit 1008 may, for example, be enabled for use with various wired communication networks, e.g., such as telephone system, a local area network, a wide area network, a personal area network, an intranet, the Internet, etc.

Mobile device 102 and/or mobile devices 103 may, for example, further comprise one or more input/output units 1014. Input/output units 1014 may represent one or more devices or other like mechanisms that may be used to obtain inputs from and/or provide outputs to one or more other devices and/or a user. Thus, for example, input/output units 1014 may comprise various buttons, switches, a touch pad, a trackball, a joystick, a touch screen, a keyboard, a microphone, a camera, and/or the like, which may be used to receive one or more user inputs. In certain instances, input/output units 1014 may comprise various devices that may be used in producing a visual output, an audible output, and/or a tactile output for a user. For example, input/output units 1014 may be used to present a video display, graphical user interface, positioning and/or navigation related information, visual representations of electronic map, routing directions, etc., via a display mechanism and/or audio mechanism.

Mobile device 102 and/or mobile devices 103 may, for example, comprise one or more sensors 1016. For example, sensor(s) 1016 may represent one or more environmental sensors, which may be useful in measuring certain atmospheric or other like phenomena which may occur in a particular environment 108. For example, sensor(s) 1016 may represent one or more inertial or environmental sensors, which may be useful in detecting certain aspects of a particular environment 108 and/or movements of mobile device 102 therein. Thus for example, sensor(s) 1016 may comprise one or more accelerometers, one or one or more gyroscopes or gyrometers, one or more magnetometers and/or the like, one or more barometers, one or more thermometers, one or more particle detectors, one or more hygrometers, one or more light sensors etc. Further, in certain instances sensor(s) 1016 may comprise and/or take the form of one or more input devices such as a microphone, a camera, etc.

SPS receiver 1018 may be capable of acquiring and acquiring wireless signals 134 via one or more antennas (not shown). SPS receiver 1018 may also process, in whole or in part, acquired wireless signals 134 for estimating a position and/or a motion of mobile device 102. In certain instances, SPS receiver 1018 may comprise one or more processing units) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 1002, memory 1004, etc., in conjunction with SPS receiver 1018. Storage of SPS or other signals for use in performing positioning operations may be performed in memory 1004 or registers (not shown).

In certain instances, sensor(s) 1016 may generate analog or digital signals that may be stored in memory 1004 and processed by DPS(s) (not shown) or processing unit(s) 1002 in support of one or more applications such as, for example, applications directed to positioning or navigation operations based, at least in part, on one or more positioning functions.

Processing unit(s) 1002 may comprise a dedicated modern processor or the like that may be capable of performing baseband processing of signals acquired and downconverted at receiver(s) 1010 of network interface unit 1008 or SPS receiver 1018. Similarly, a modem processor or the like may perform baseband processing of signals to be upconverted for transmission by (wireless) transmitter(s) 1012. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

Long term evolution (LTE) is a mobile network radio technology that may be deployed by wireless network/system operators who may also use GSM (Global System for Mobile Communications, originally Groupe Spécial Mobile) and/or CDMA (code division multiple access) and/or WCDMA technologies. The LTE positioning protocol (LPP) and more recent LPP Extensions (LPPe) standards represent example positioning protocols which may, at least in part, be used and/or adapted to support at least some of the example techniques as described herein.

By way of example, in certain implementations a provisioning protocol such as, e.g., LPP, LPPe, and/or the like, may support an exchange of information via of one or more messages from a remote device to a mobile device, wherein at least some of the information may correspond to at least a portion of information illustrated in the examples herein as a reference data report. For example, in certain instances, one or more LPPe AtmosphericPressureAD message(s) may be used, which may be indicative of one or more of the following:

(1) a reference Pressure, corresponding to a reference altitude;
(2) a pressureValidityArea (e.g. a rectangle, circle, ellipse or polygon);
(3) a pressureValidityPeriod;
(4) a referencePressureRate;
(5) a gN-pressure (e.g., a northward pressure gradient); and/or
(6) a gE-pressure (e.g., an eastward pressure gradient).

Here, for example, a referencePressure may specify an atmospheric pressure (hPa) at a zero level in the WGS84 reference geoid or in the Earth Gravitational Model 1996 (EGM96) reference geoid. If a pressureValidityArea is provided, a referencePressure may refer to a center of the pressureValidityArea. The pressure within a pressureValidityArea outside the center may be calculated using pressure gradients (e.g., gN-pressure and/or gE-pressure) if provided. If no northward and eastward pressure gradients are provided, a pressure may be assumed to be constant throughout the pressureValidityArea. If no referencePressureRate is provided, a pressure may be assumed to be constant (i.e. not vary in time) at each location throughout the pressureValidityPeriod. Otherwise, a provided referencePressureRate may provide the rate of change of pressure with time at any location within the pressureValidityArea starting at the beginning of the pressureValidityPeriod if provided or starting at the time of transmission of the reference data report otherwise. By way of example, in certain instances a scale factor for the referencePressure and referencePressure gradients may be 0.1 hPa and a nominal pressure may be used of 1013 hPa to which other provided values are added or subtracted. A pressureValidityPeriod may, for example, specify a start time and duration of the reference pressure validity period. If a pressureValidityPeriod is not present, such atmospheric pressure assistance data provided within a reference data report may be valid only at precisely the time the assistance data is received at the mobile device. A pressureValidityArea may, for example, specify an area (e.g. a rectangle, circle, ellipse or polygon) within which the provided reference atmospheric pressure is valid. If such information is not present, the provided atmospheric reference pressure may only be valid at the mobile device's position at the moment the atmospheric reference pressure is provided. A pressure validity area may, for example, specify a rectangle defined by its Center Point (centerPoint), width (validityAreaWidth) and height (validityAreaHeight). Here for example, width maybe measured from a center along a latitude and height may be measured from a center along a longitude. Width and height may, for example, be measured as a total width and height of a rectangle. Here, for example, a scale factor may be Km. A gN-pressure may, for example, specify a northward gradient of the reference atmospheric pressure calculated from a center of a pressureValidityArea. Here, for example, a scale factor may be 10 Pa/Km. If such information is not provided, such a gradient may be assumed to be zero. A gE-pressure may, for example, specify an eastward gradient of the reference atmospheric pressure calculated from a center of the pressureValidityArea. Here, for example, a scale factor may be 10 Pa/Km. If such information is not provided, such a gradient may be assumed to be zero.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at an electronic device:
   receiving an environment report from a mobile device, the environment report being indicative of a measurement obtained via an environmental sensor, the environmental sensor comprising a barometer, provisioned with the mobile device, and a location of the mobile device, the measurement being determined based, at least in part, on a local atmospheric pressure;
   determining a reference atmospheric pressure based at least in part on the local atmospheric pressure;
   generating an updated reference data report based, at least in part, on the local atmospheric pressure of the environment report, the updated reference data report comprising:
      the reference atmospheric pressure;
      a reference altitude corresponding to the reference atmospheric pressure at the location of the mobile device; and
      an existing reference data report, the existing reference data report comprising atmospheric pressure measurements and location measurements communicated from one or more mobile devices, the atmospheric pressure measurements and the location measurements being obtained in an area including the location of the mobile device;
   and
   transmitting the updated reference data report to the mobile device.

2. The method as recited in claim 1, wherein the environment report is further indicative of:
   a horizontal position history for the mobile device;
   a movement of the mobile device;
   a movement history for the mobile device;
   an altitude history for the mobile device;
   a relative altitude of the mobile device;
   a relative altitude history for the mobile device;
   an atmospheric pressure history;
   a local atmospheric temperature;
   an atmospheric temperature history;
   a local atmospheric humidity;
   an atmospheric humidity history;
   an indication of an indoor environment;
   an indication of an outdoor environment; or
   a difference between an atmospheric pressure in an indoor environment and an atmospheric pressure in the outdoor environment, or any combination thereof.

3. The method as recited in claim 1, wherein the environment report is further based, at least in part, on a user-supplied observation corresponding to a particular environment.

4. The method as recited in claim 1, wherein the location for the mobile device is determined at least in part using: Assisted Global Navigation Satellite System (A-GNSS); Observed Time Difference of Arrival (OTDOA); Advanced Forward Link Trilateration (AFLT) or Enhanced Cell ID (E-CID), or any combination thereof.

5. The method as recited in claim 1, wherein the reference data report is further indicative of:

a reference pressure rate corresponding to the reference atmospheric pressure; or a directional pressure gradient corresponding to the reference atmospheric pressure, or a combination thereof.

6. An apparatus comprising:

means for receiving an environment report from a mobile device, the environment report being indicative of a measurement obtained via an environmental sensor, the environmental sensor comprising a barometer, provisioned with the mobile device, and a location of the mobile device, the measurement being based, at least in part, on a local atmospheric pressure;

means for determining a reference atmospheric pressure based at least in part on the local atmospheric pressure;

means for generating an updated reference data report based, at least in part, on the local atmospheric pressure of the environment report, the updated reference data report comprising:

the reference atmospheric pressure;

a reference altitude corresponding to the reference atmospheric pressure at the location of the mobile device; and an existing reference data report, the existing reference data report comprising atmospheric pressure measurements and location measurements communicated from one or more mobile devices, the atmospheric pressure measurements and the location measurements being obtained in an area including the location of the mobile device;

and means for transmitting the updated reference data report to the mobile device.

7. The apparatus as recited in claim 6, wherein the environment report is further indicative of:

a horizontal position history for the mobile device;
a movement of the mobile device;
a movement history for the mobile device;
an altitude history for the mobile device;
a relative altitude of the mobile device;
a relative altitude history for the mobile device;
an atmospheric pressure history;
a local atmospheric temperature;
an atmospheric temperature history;
a local atmospheric humidity;
an atmospheric humidity history;
an indication of an indoor environment;
an indication of an outdoor environment; or
a difference between an atmospheric pressure in an indoor environment and an atmospheric pressure in the outdoor environment, or any combination thereof.

8. The apparatus as recited in claim 6, wherein the environment report is further based, at least in part, on a user-supplied observation corresponding to a particular environment.

9. The apparatus as recited in claim 6, wherein the location for the mobile device is determined at least in part using: Assisted Global Navigation Satellite System (A-GNSS); Observed Time Difference of Arrival (OTDOA); Advanced Forward Link Trilateration (AFLT); Enhanced Cell ID (E-CID) or an inertial sensor, or any combination thereof.

10. The apparatus as recited in claim 6, wherein the reference data report is further indicative of:

a reference pressure rate corresponding to the reference atmospheric pressure; or a directional pressure gradient corresponding to the reference atmospheric pressure, or a combination thereof.

11. A device comprising:
a network interface unit; and
a processing unit to:
obtain an environment report received from a mobile device via the network interface unit, the environment report being indicative of a measurement obtained via an environmental sensor, the environmental sensor comprising a barometer, provisioned with the mobile device, and a location of the mobile device, the measurement being based, at least in part, on a local atmospheric pressure;

determine a reference atmospheric pressure based, at least in part, on the local atmospheric pressure;

generate an updated reference data report based, at least in part, on the local atmospheric pressure of the environment report, the updated reference data report to comprise:

the reference atmospheric pressure;

a reference altitude corresponding to the reference atmospheric pressure at the location of the mobile device; and an existing reference data report, the existing reference data report comprising atmospheric pressure measurements and location measurements communicated from one or more mobile devices, the atmospheric pressure measurements and the location measurements being obtained in an area including the location of the mobile device;

and initiate transmission of the reference data report to the mobile device via the network interface unit.

12. The device as recited in claim 11, wherein the environment report is further indicative of:

a horizontal position history for the mobile device;
a movement of the mobile device;
a movement history for the mobile device;
an altitude history for the mobile device;
a relative altitude of the mobile device;
a relative altitude history for the mobile device;
an atmospheric pressure history;
a local atmospheric temperature;
an atmospheric temperature history;
a local atmospheric humidity;
an atmospheric humidity history;
an indication of an indoor environment;
an indication of an outdoor environment; or
a difference between an atmospheric pressure in an indoor environment and an atmospheric pressure in the outdoor environment, or any combination thereof.

13. The device as recited in claim 11, wherein the environment report is further based, at least in part, on a user-supplied observation corresponding to a particular environment.

14. The device as recited in claim 11, wherein the location for the mobile device is determined at least in part using: Assisted Global Navigation Satellite System (A-GNSS); Observed Time Difference of Arrival (OTDOA); Advanced Forward Link Trilateration (AFLT); Enhanced Cell ID (E-CID) or an inertial sensor, or any combination thereof.

15. The device as recited in claim 11, wherein the reference data report is further indicative of: a reference pressure rate corresponding to the reference atmospheric pressure; or a directional pressure gradient corresponding to the reference atmospheric pressure, or a combination thereof.

16. A non-transitory computer readable medium having computer implementable instructions stored therein that are executable by a processing unit of an electronic device to:

obtain an environment report received from a mobile device, the environment report being indicative of a measurement obtained via an environmental sensor, the environmental sensor comprising a barometer, provisioned with the mobile device, and a location of the mobile device, the measurement being based, at least in part, on a local atmospheric pressure;

determine a reference atmospheric pressure based at least in part on the local atmospheric pressure;

generate an updated reference data report based, at least in part, on the local atmospheric pressure of the environment report, the updated reference data report to comprise:

the reference atmospheric pressure;

a reference altitude corresponding to the reference atmospheric pressure at the location of the mobile device; and an existing reference data report, the existing reference data report comprising atmospheric pressure measurements and location measurements communicated from one or more mobile devices, the atmospheric pressure measurements and the location measurements being obtained in an area including the location of the mobile device;

and initiate transmission of the reference data report to the mobile device.

17. The non-transitory computer readable medium of claim 16, wherein the environment report is further indicative of:

a horizontal position history for the mobile device;
a movement of the mobile device;
a movement history for the mobile device;
an altitude history for the mobile device;
a relative altitude of the mobile device;
a relative altitude history for the mobile device;
an atmospheric pressure history;
a local atmospheric temperature;
an atmospheric temperature history;
a local atmospheric humidity;
an atmospheric humidity history;
an indication of an indoor environment;
an indication of an outdoor environment; or
a difference between an atmospheric pressure difference in an indoor and an atmospheric pressure in the outdoor environment, or any combination thereof.

18. The non-transitory computer readable medium of claim 16, wherein the environment report further is based, at least in part, on a user-supplied observation corresponding to a particular environment.

19. The non-transitory computer readable medium as recited in claim 16, wherein the location for the mobile device is determined at least in part using: Assisted Global Navigation Satellite System (A-GNSS); Observed Time Difference of Arrival (OTDOA); Advanced Forward Link Trilateration (AFLT); Enhanced Cell ID (E-CID) or an inertial sensor, or any combination thereof.

20. The non-transitory computer readable medium of claim 16, wherein the reference data report is further indicative of: a reference pressure rate corresponding to the reference atmospheric pressure; or a directional pressure gradient corresponding to the reference atmospheric pressure, or a combination thereof.

* * * * *